United States Patent [19]

Kryskow, Jr. et al.

[11] Patent Number: 4,491,946
[45] Date of Patent: Jan. 1, 1985

[54] MULTI-STATION TOKEN PASS COMMUNICATION SYSTEM

[75] Inventors: J. Michael Kryskow, Jr., Hudson; Jeffery J. Bobzin, Salem; Bruce S. Allen, East Kingston, all of N.H.

[73] Assignee: Gould Inc., Rolling Meadows, Ill.

[21] Appl. No.: 241,688

[22] Filed: Mar. 9, 1981

[51] Int. Cl.³ .............................................. H04J 6/02
[52] U.S. Cl. .................................... 370/89; 340/825.5
[58] Field of Search ...................... 370/85, 92, 95, 89, 370/60, 94; 340/825.04, 825.52, 825.5, 825.51; 455/31, 38

[56] References Cited

U.S. PATENT DOCUMENTS

| | | |
|---|---|---|
| 3,296,596 | 1/1967 | Yagusic et al. |
| 3,517,130 | 6/1970 | Rynders |
| 3,522,381 | 7/1970 | Feder |
| 3,564,145 | 2/1971 | Deutsch et al. |
| 3,597,549 | 8/1971 | Farmer et al. |
| 3,603,739 | 9/1971 | Edson |
| 3,646,273 | 2/1972 | Nadir et al. |
| 3,646,274 | 2/1972 | Nadir et al. |
| 3,697,959 | 10/1972 | Abramson et al. |
| 3,701,109 | 10/1972 | Peters .............................. 340/825.51 |
| 3,732,543 | 5/1973 | Rocher et al. |
| 3,742,148 | 6/1973 | Ledeen et al. |
| 3,749,845 | 7/1973 | Fraser |
| 3,752,921 | 8/1973 | Audretsch et al. |
| 3,787,627 | 1/1974 | Abramson et al. |
| 3,790,717 | 2/1974 | Abramson et al. |
| 3,796,992 | 3/1974 | Nakamura et al. |
| 3,803,405 | 4/1974 | Ohasorge et al. |
| 3,855,422 | 12/1974 | Cadiou et al. |
| 3,863,220 | 1/1975 | Osawa et al. |
| 3,898,373 | 8/1975 | Walsh ................................. 179/2 C |
| 3,911,218 | 10/1975 | Suzuki et al. |
| 3,919,483 | 11/1975 | Gindi |
| 3,932,841 | 1/1976 | Deerfield et al. |
| 3,963,870 | 6/1976 | Couder et al. |
| 3,969,586 | 7/1976 | Wakamatsu |
| 3,970,994 | 7/1976 | Jenny |
| 3,985,962 | 10/1976 | Jones |
| 3,988,545 | 10/1976 | Kuemmerle et al. |
| 4,017,688 | 4/1977 | Callens et al. |

(List continued on next page.)

FOREIGN PATENT DOCUMENTS 33228 8/1981 European Pat. Off. .
2013452A 8/1979 United Kingdom .

OTHER PUBLICATIONS

Control Engineering, vol. 27, No. 9, Sep. 1980, M. J. McGowan: "Process Bus Protocol Orchestrates Distributed or Centralized Control", pp. 129–132.
Electronic Design, vol. 29, No. 8, Apr. 16, 1981, Allan: "Local-Net Architecture, Protocol Issues Heating Up", pp. 91 to 98, 100 and 102.

Primary Examiner—Benedict V. Safourek
Attorney, Agent, or Firm—Mattern, Ware, Stoltz & Fressola

[57] ABSTRACT

A data communication system is disclosed that utilizes a synchronized serial bus for communication between multiple stations connected to the bus. A token is employed such that when owned by a station it allows that station to transmit high level messages over the bus and command other stations to transmit high level messages to it if required by the token owner. Fundamental events called primitives are perceived by stations. Each station capable of token ownership embodies the same set of rules, the rules in turn defining the circumstances when perceived events cause a station to change from one state to another.

Fundamental sets of rules, or modules, are used in the communication system to achieve a system for the automatic generation of a token list of stations with periodic ownership of the token, as well as for expansion or contraction of this token list. In addition, automatic change in the token pass handshake protocol is described.

The communication system allows bus interconnection to stations having no potential token access, with communication control provided by master stations which have token ownership capability.

80 Claims, 21 Drawing Figures

U.S. PATENT DOCUMENTS

| | | |
|---|---|---|
| 4,019,176 | 4/1977 | Cour et al. . |
| 4,024,501 | 5/1977 | Herring et al. . |
| 4,032,893 | 6/1977 | Moran . |
| 4,052,566 | 10/1977 | MacKay . |
| 4,058,681 | 11/1977 | Imaizumi et al. ............... 370/85 |
| 4,074,232 | 2/1978 | Otomo et al. . |
| 4,079,209 | 3/1978 | Schwerdtel . |
| 4,081,612 | 3/1978 | Hafner . |
| 4,093,823 | 6/1978 | Chu . |
| 4,096,355 | 6/1978 | Rothauser et al. . |
| 4,124,776 | 11/1978 | Nocker . |
| 4,137,522 | 1/1979 | Stein ............... 340/825.51 |
| 4,155,115 | 5/1979 | Wilske . |
| 4,156,106 | 5/1979 | Bumgardner . |
| 4,161,786 | 7/1979 | Hopkins . |
| 4,166,198 | 8/1979 | Mattern . |
| 4,199,662 | 4/1980 | Lowe, Jr. . |
| 4,199,663 | 4/1980 | Herzog . |

---WIRE DEAD 10 MSEC---

10 WAKES UP

---100 USEC TIMEOUT---

---100 USEC TIMEOUT---

10 FINDS 13

---100 USEC TIMEOUT---

13 FINDS 15

MULTI-STATION TOKEN PASS COMMUNICATION SYSTEM

TECHNICAL FIELD

The present invention relates to communication systems and in particular to non-contention communication systems utilizing a single conceptualized token which is passed between stations communicating on a single bus, wherein each station when "owning" the token has the right, to the exclusion of other stations, to initiate high level message transmissions and, if desired, to cause other stations to transmit high level reply messages.

BACKGROUND ART

Multi-station communication systems typically reside in one of two major categories, master controlled systems and master-less systems. The former category utilizes a central processing unit or other supervisory control which observes and dictates which station has access to the commonly shared data transmission resource; typically the bus interconnecting the various stations. Unlike such systems, the present invention is a master-less communication system.

With respect to master-less communication systems, two general categories exist; namely, contention systems and token pass systems. The former contention systems are unlike the present invention in that they allow multiple stations to contend for access to the bus as the general means for transferring control of the bus from one station to another station. The present invention, although allowing for the possibility of contention when multiple stations simultaneously demand access to the token, generally only uses a contention-less token pass system.

As to contention systems, the joint project developed by Digital Equipment Corporation, Maynard, Mass.; Intel Corporation, Santa Clara, Calif., and Xerox Corporation, Stamford, Conn., known as Ethernet ™, and as described in U.S. Pat. No. 4,063,220, Metcalfe et al, allows any station connected to the bus to transmit information provided that the bus is clear just prior to and during the transmission. If it detects noise on the bus while transmitting, it is assumed that an interference or collision has occurred between itself and at least one other station attempting to transmit information on the bus at the same time. In order to correct this problem the transmitter section is disabled on each station and a random number generator is used to select an interval of time at the completion of which the next attempt at transmission will take place. At the same time, a counter counts the number of interferences, or collisions, which occur in the attempted transmissions of one data packet and weights the mean of the random number generator accordingly. In this way, the stations attempting to transmit will reattempt to transmit at different times and thus, in time, eliminate the contention between the stations.

The present invention does not utilize such a contention or collision detection system but rather uses the concept of a token which is passed from one station to another such that each station when owning the token has, during that time, the exclusive right to initiate high level message transmissions as well as to request return high level messages from any other station.

With respect to a token pass communication system, a representative prior art technique is disclosed in U.S. Pat. No. 4,058,681, Imaizumi et al. This reference discloses an information transmission system utilizing a token which is transmitted from one station to the next by use of a command established signal (ELS) and a transfer command signal (SEL). The token is passed from station to station through use of the SEL signal giving the address of the next station which is to have the token. Upon receiving the token, that next station transmits the command establish signal to inform the other stations that it does have command. If the station presently having the token does not transmit an ELS or SEL signal within a predetermined time, another station takes the token by transmitting its own ELS signal. A failure of a station to detect the transfer of the token from itself to the next addressed station within a predetermined time causes the station which originally had the token to retransmit a new SEL signal with a new address so as to transfer the token to a different station. This reference however does not disclose the concept of an arc of control wherein the present token owner (holder) knows both the station from which it received the token as well as the station to which it is to next transfer the token. This arc of control in combination with a demand window by which the present token owner can transfer the token to a demander not in the token list provides the capability of both patching in and patching out stations to the token list of stations presently passing ownership of the token on a systematic basis. Imaizumi et al also neither discloses nor suggests the concept of automatically changing the handshaking protocol between token passing stations.

Imaizumi et al further does not disclose or suggest the binding concept of the present invention wherein stations may have physical connection to the bus and yet never have the possibility of obtaining the token for control of the bus. These stations are thus only able to respond to other stations which can be token owners. The binding concept allows the communications system to interconnect with relatively low level access stations which would otherwise be incapable of transmitting information on the bus.

Furthermore, the present invention through use of its underlying perceived events and their causal effect through rule interaction to change station states, can be reconfigured to form new and different communication systems having different access mechanism protocols depending upon the particular requirements of a communication network desired by the user.

DISCLOSURE OF THE INVENTION

A synchronized serial bus communications systems utilizing token passing is described. The commonly shared wire or bus is a passive communication vehicle onto which a plurality of stations interconnect for communication therebetween. In one version of the present invention, each station contains a plurality of access mechanism modules, the modules representing changes of state based on rules representing actions to be taken when events are perceived by a station. Each station, when possessing, holding, or owning the token (these verbs are used synonymously with respect to the token) is the only station that can initiate the transfer of non-access type messages (called high level messages in this document) over the bus to other stations and which can also command the transmission of high level messages from other stations to itself (surrogate message transfers to third party stations are not utilized in the present invention, though could be if desired). Once token ownership is obtained by a station, the manner of data communication between that station and another station can meet with one or more well-known standards such as the International Standards Organization's high level data link controller (HDLC) described in their document number ISO/DIS 3309.2.

Some of the fundamental attributes of the present invention's access mechanism are its technique for determining which station is to next own the token by each station knowing its FROM and TO station, how patch in and patch out, and automatic token pass handshake protocol transitions depending upon the pristine nature of previous token passes between the particular stations. Furthermore, the present invention describes the capability of special slave stations interconnecting to the bus which have no mechanism for their own access of the token, yet which can communicate through master stations which do have token access capabilities.

In particular, the access mechanism of the present invention provides the ability of any station (other than slave stations mentioned above) to potentially be on a token list (loop or ring) of stations which periodically obtain ownership of the token.

Once this initial token list of stations is generated, each station passes the token according to an overall protocol comprising a set of interconnected states whose transitions depend upon particular events occurring as perceived by the stations and acted upon by governing rules. Typical of these rules are that only one token can exist at a single time with respect to any group of stations connected to a single bus; that each station knows the same overall state protocol as all other stations which have potential access to the token; that the load or degree of use of data communications can be observed by any station by listening to the communications transmitted across the bus, including the amount of time for stations to acquire the token. With respect to this latter observation, a station can ascertain the number of other stations connected to the bus having token access; that is, how many are part of the token list.

The rules can be thought of as the particular format for receiving messages which initiate changes of state and thus, that a particular change from one stable state to another cannot occur unless certain events, such as timeouts or messages, occur. The rules defining the way that messages must occur can be considered the rules for changing state. The states themselves are thus the configurations that any station can be found in, while the rules define the way stations change states as based upon perceived events. The interconnections of the states to each other depending upon the events observed by that station define the overall state map which represents a particular communication system.

Certain underlying configurations of the state map form integral subsets of the communication system. One such underlying subset of states comprises the arc of control in which each station in the token list knows both the station from which it receives the token (the FROM station) as well as the station to whom the station passes the token (the TO station). In this way the FROM station, the present token owner station and the TO station form a conceptual arc if the token list is considered a circle with each station resident at a different location on the circumference of the circle. This arc moves around the conceptualized circle as the token is passed from one station to the next. Since the FROM and TO stations need not be the physically adjacent stations, it is necessary that each station have a unique address that allows any station to be the FROM station with respect to another station as well as for any station to be a TO station with respect to another station. It is required, however, that no station be a FROM station with respect to more than one other station and a similar constraint for TO stations. Thus, the arc of control concept further encompasses the idea that each arc of control is unique.

Since the station to which the current station passes the token then becomes the token owner, a TO station also must know its FROM and its TO station and thus, the arc of control moves around the loop with each new arc; that is, the three stations associated together overlap as the arc moves around the loop.

Another portion of the subset of states forming the present invention is the ability to patch in and patch out stations without supervisory control. One patching out situation can arise when the token owner's TO recognizes that its FROM has not used the token and is not passing the token. If this continues beyond a particular time out (½T), then the station which is to next receive the token, picks it up from its FROM. Similarly, if a present baton token owner's TO station does not acknowledge receipt of the token upon its presentation by the present token owner, the present station will attempt to repass the token and if unsuccessful for some predetermined number of tries, will assume that its TO station is defective and will then go to a WHO'S NEXT state to determine who is the next station in the logical ring to have the token. That next station will then receive the token from the present token owner.

Another portion of the subset of states is the patch in of a station to the token list. In order to do this, the station which is out of the loop listens to the bus to ascertain the correct time for demanding access.

Another subset of interrelated states embodied within the present invention is the automatic handshake protocol change made between stations passing the token. If the token passes are successful and without error for a predetermined number of tries, the handshake protocol for passing the token is streamlined. Thus, for example, under normal conditions, the present token owner requires a three signal protocol for passing the token; namely, first sending a token enable signal to its TO station, the TO station responding with a token acknowledge signal, and then the present token owner sending the token to its TO position. If such a token passing sequence has been successful for some predetermined number of times, typically 16 consecutive passes without any problems, then the present token owner will shift to a single message token pass; that is, omitting the token enable signal and the token acknowledge signal before passing the token. This increases the overall speed for token passing. If, for some reason, after shifting to this less formalized protocol the TO station does not respond properly to token ownership or if any other problem is perceived by the stations in the particular arc, the stations will automatically shift down to the more structured handshake protocol to insure proper passing of the token. This ability for each station and its neighboring station in the arc to shift the handshake protocol depending upon their success in passing the token between themselves allows for a more efficient use of the token resource and thus a more efficient communication system. Of course, different stations in different arcs of the loop may be in different handshake protocols depending upon their particular success in passing the token.

An optional subset of states embodied in the present invention is the binding concept whereby a station which has the capability of being a token owner can also be a master with respect to one or more slave stations connected to the bus but which do not have the capability of token ownership. In this particular manner, slave stations need not have embodied within them the rules defining the access protocol for token ownership, yet may communicate with other stations on the bus through their control by a master station via a query window or respond opportunity. Furthermore, more than one master station may have access to the same slave or slave stations thereby facilitating communications between these slaves and various token owner stations in the token list.

Although not specifically disclosed in this application, the present concepts further include those of virtual token passing wherein no signal is transmitted between the present token owner and the next station to have the token if all stations in the loop are working in what would be called a pristine environment, that is, when all token passes for some predetermined number of times for all of the stations has occurred without error. This, in essence, is a further shifting of the handshake protocol to a still faster mode in which no handshaking between station owners passing the token occurs.

OBJECTS OF THE INVENTION

Therefore, a principal object of the present invention is a communication system for multiple stations utilizing a single communications resource through use of a synchronized serial bus in which each station having the capability of access to the resource has the same rules defining state transitions for perceived events as all other station having potential access to the resource and in which therefore a token pass masterless communication system results.

A further object of the present invention is a token pass communication system in which each station can become a member of a token list for periodic access to the token.

A further object of the present invention is a communication system of the above description in which each station in the token list knows both the station from which it received the token (its FROM) and the station to whom it passes the token (its TO) and in which each station has a unique address with respect to all other stations.

A still further object of the present invention is a communication system of the above description in which during token passing from one station to another station, there is a period of time called a demand window, in which a station not a member to the token list may demand access to the token and thereby become patched into the token list.

A still further object of the present invention is a communication system of the above description in which defective stations are automatically taken out (patched out) from the token list.

A still further object of the present invention is a communication system of the above description in which the handshaking protocol for passing the token is automatically shifted to a faster or slower procedure depending upon previous success of token passes between the same stations, or the stations perceptions of the bus.

Another object of the present invention is a communication system of the above description which can provide interconnection of non-token owning stations that are under the control of one or more token owning master station.

A still further object of the present invention is a communication system of the above description that can automatically initialize a token list during power up and during times when multiple failures occur.

Another object of the present invention is a communication system of the above description in which no single station failure will incapacitate the system (no initialization sequence will result).

A further object of the present invention is a communication system of the above description in which the system can be modified to meet the user's needs without departing from the underlying rules of the communication system.

A still further object of the present invention is a communication system of the above description in which the bus may be broken and whereby separate token lists are then generated such that if the bus is repaired, a single larger token list with only one token is automatically generated.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings, in which:

FIG. 17, comprising

FIGS. 17A–17D are put together.

BEST MODE FOR CARRYING OUT THE INVENTION

Figure 2:
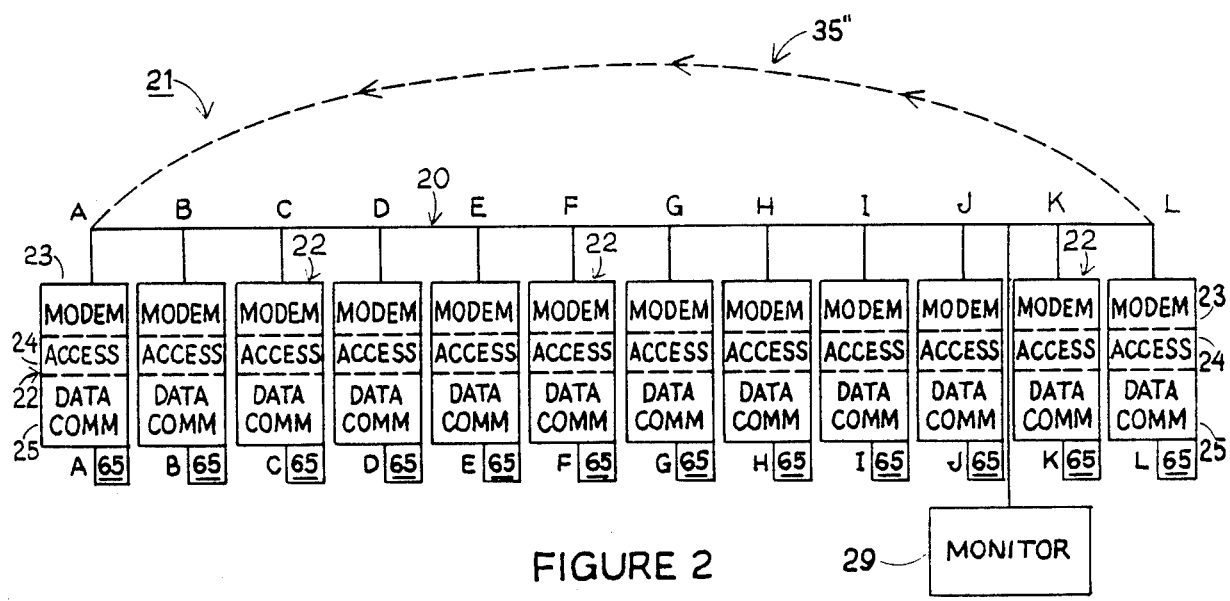
FIG. 2 is a block diagram of a communication system according to the present invention illustrating that each station has a modem, an access mechanism module, a timer and a data communication module forming part of the station for acquiring access and transmitting and receiving high level (HDLC) messages between stations after a station has ownership of the token, and also showing a monitor attached to the bus.

FIG. 2 illustrates a block diagram showing how a commonly shared resource, typically a bus 20, is utilized between multiple stations 22 that are physically connected to the bus to form a local area network type communication system 21. The bus is typically fabricated from co-axial cable such as that used for cable television with the stations interconnected to the bus by standard co-axial cable connectors well known in the art. For local area networks, the bus length could be from a few hundred feet to several miles.

In a typical network, the stations may number from 1 to 255, each station having a unique address. It is possible however for a local area network communication system to have thousands of stations attached to it, such as in a large office building or a city. In the example shown in FIG. 2, there are twelve stations connected to the bus, the stations denoted by the letters A-L respectively. Each station comprises three basic parts: a modem 23 that physically receives and transmits messages to and from the bus, an access module 24 which embodies the rules forming the states of the present invention which provide for access by that station to the bus in response to perceived events, and a data communication section 25 which utilizes some form of high level message protocol for the actual transfer of data between one station and another. A timer 65 also forms part of each station. As to the data communication protocol, any standard format can be utilized although the present invention is primarily directed to utilizing a standard being developed by the International Standards Organization as detailed in their document known as Reference Model of Open Systems Interconnection (Document ISO TC97/SC16/N537) which is directed to standards for the exchange of information among terminal devices, computers, people, networks, processors that are open to one another for this purpose by virtue of their mutual use of an applicable standard. Such a standard envisions the transfer of information between systems to be performed by a physical media for systems interconnection in which each system is viewed as being composed of logically ordered set of subsystems.

Throughout the description contained herein, the actual format for transmitting messages once access to the bus has been obtained by a station, is described as a high level data link control, and thus the data communication section 25 can be any high level data link controller known in the art. The acronym used throughout the drawings and specification of this document for such messages is HDLC.

Since the present invention typically uses a commonly shared passive communication link's resource such as a coaxial bus, it is generally considered to be directed to communications in a local area network comprising a plurality of stations interconnected to the bus. The purpose of this communication system is to allow distributed sharing of this communication resource where each station is allowed to hear all other stations and any station, other than special slave stations, can theoretically control the resource at some given time. In particular, the present invention is directed to the sets of rules for denoting the various states that each station can reside in, depending upon observed events known herein as primitives. These events are typically some form of activity heard on the bus or the passage of time which is realized by the station due to internal clocks 65 contained in each station. Throughout this description, it should be emphasized that all events are perceived from the perspective of the individual station. It is not necessary nor even realistic that each station perceive an event on the bus in the same way all the time. This, of course, is due to such things as potential noise in the system, potential station failures and potential bus failures. Also the same event will not be perceived at the same absolute time for all stations due to propagation delays.

Figure 5:
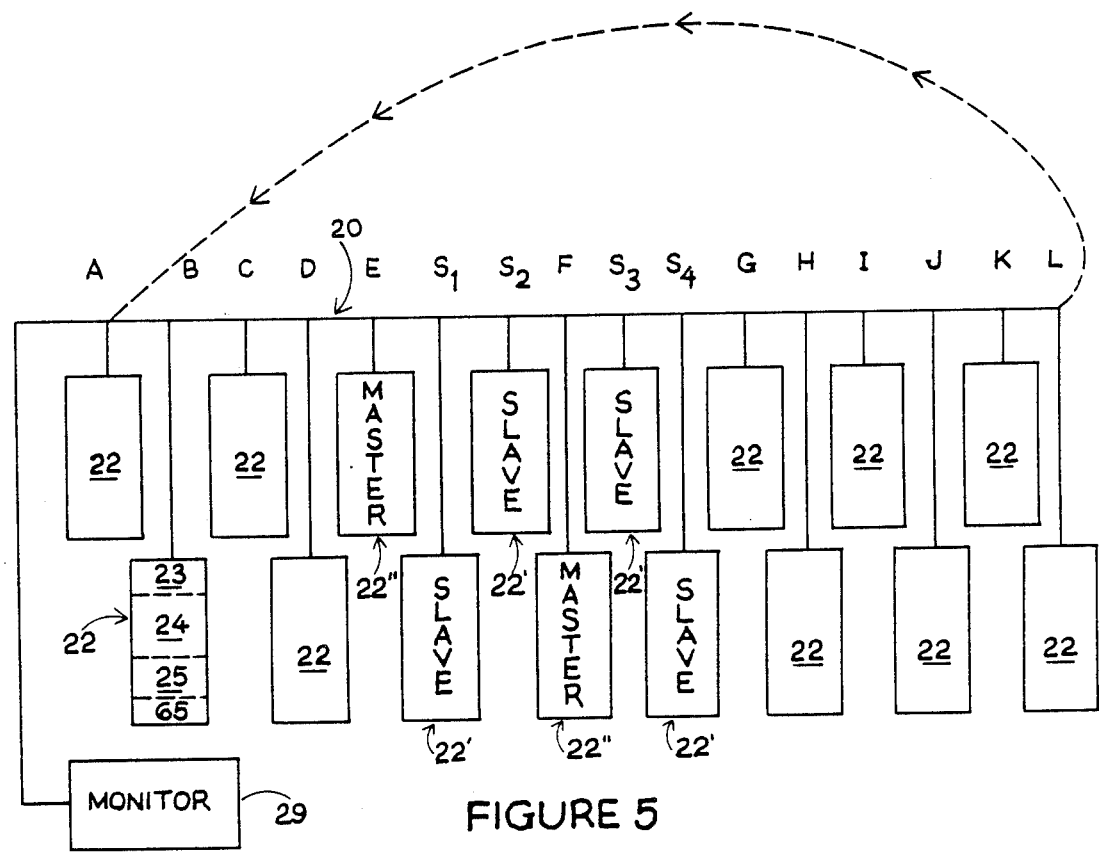
FIG. 5 is a block diagram representation of FIG. 4 showing that the SLAVE stations are physically connected to the bus along with the other stations which have token access capability, it also shows a monitor connected to the bus.

In order for the stations shown in FIG. 2 to be able to communicate with each other, the use of the conceptualized token is implemented by the present invention. The token, sometimes called a baton, is the conceptualized device by which a station is given the right to transmit messages from its data communication module onto the bus as well as to command other stations to transfer messages to it. Without the token in a station's possession, a station may not initiate the transmission of messages from its data communication module. (A station may be granted a respond opportunity by the token owner to transmit a single message). Thus, the present invention is directed to the rules for allowing the token to pass from one station to another in such a manner that the entire system need not be under any supervisory control and is able to not only initialize the passing of the token among stations, but is also able to perform several other functions; namely, the ability to add and remove stations to the list of stations which have access to the token—the token list—and the ability to automatically change the protocol utilized by token passing stations in their handshaking operation for transferring the token from one station to another. The present invention is also directed to the ability for stations to be connected to the bus such as shown in FIG. 5, wherein some of these stations, such as S1, S2, S3 and S4, do not have the capability of ever obtaining access to the token. These stations, denoted in general by the numeral 22', are only able to communicate data under the direct control of a master station such as station 22", (stations E and F). Each master station may control one or more slave stations and indeed different master stations may have overlapping control of the same slave station. This interconnection of stations to the bus without embodying the token holding module as part of those stations allows relatively simple data communication devices to be attached to the bus and yet not degrade the overall communication on the bus. Typical slave stations could be physical parameter sensors (such as for heat or light) and industrial control devices (such as programmable controllers).

Figure 1:
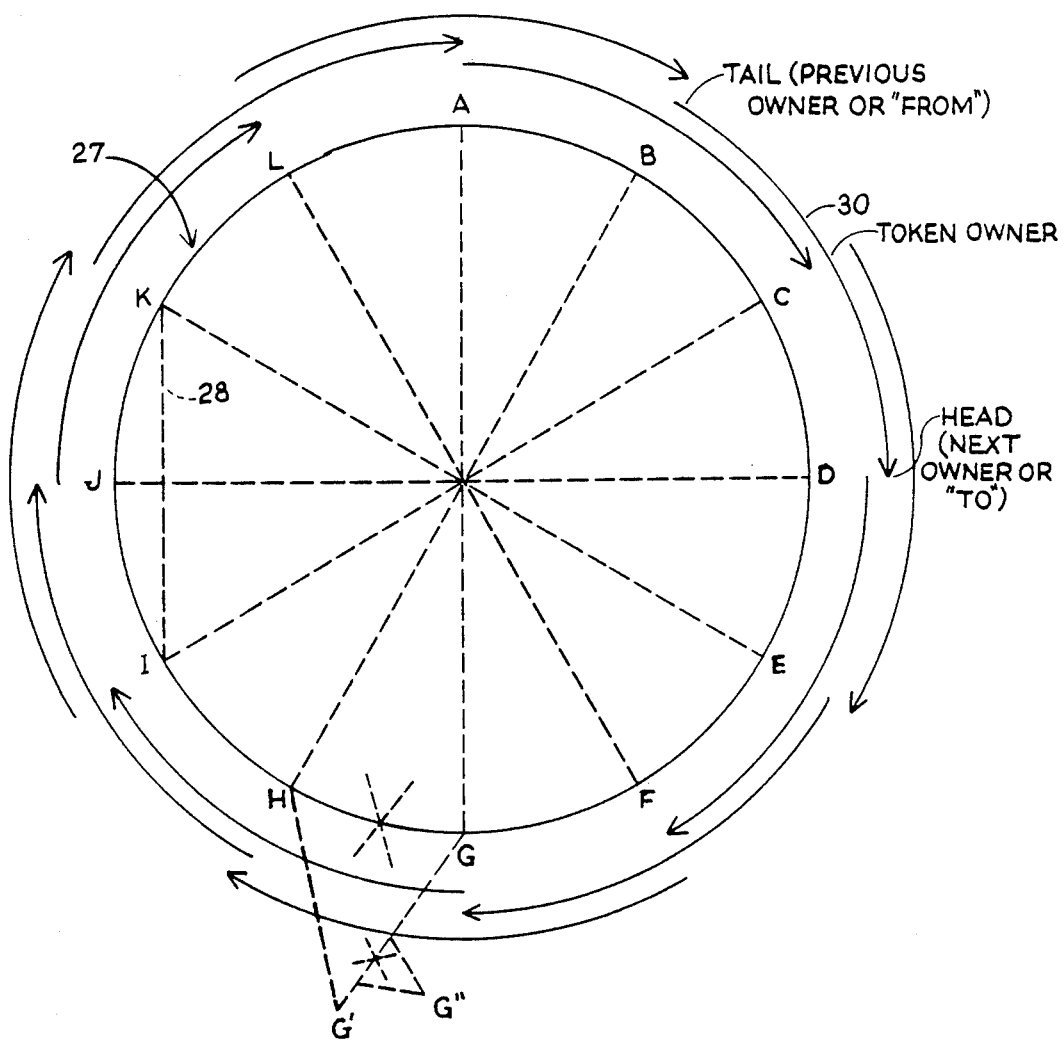
FIG. 1 is a diagrammatic representation of a local area network communication system according to the present invention, illustrating the arc of control whereby three stations are related to each other by their FROM, TOKEN OWNER, and TO and also showing patch in and patch out.

It should be noted at the onset that although a virtually unlimited number of stations may be physically connected to the bus and may each have the capability of being an owner of the token at some time, only those stations which are on the conceptualized token list or token loop are able to gain access to the token in the ordinary course of events. For example, FIGS. 1 and 2 illustrate twelve different stations on the bus. The circle 27 denoted in FIG. 1 can be visualized as the token loop or token list if each of these twelve stations presently have the token passed to it. Thus, each station on that loop or list (sometimes also known as a token ring) has sequential synchronized access to the token. Thus, for example, if this list was in existence at a particular time, the token would be sequentially passed from station A to station B to station C, etc. up to station L, which would then pass it back to station A and continuing around in a circle. Other stations may also be connected to the bus such as stations G' and G" shown in FIG. 1. These stations, however, are not part of the token list as shown in FIG. 1 and would have to get into the list in order to have periodic ownership of the token and thereby periodic control of the bus for initiating high level messages and for commanding other stations to transmit high level messages to them. The rules for a station becoming part of the token list, sometimes called patch in, are discussed further on in this detailed description.

Furthermore, the present invention provides that any one station that becomes inoperative in its ability to receive and pass the token in an error free manner cannot cause the overall communication system to fail. For example, as shown in FIG. 1, station J may for some reason become faulty—a typical example being that its receiver is no longer able to receive information and therefore it is unable to know when the token is being passed to it. This fault would be observed by the other stations since, as stated earlier, each station is able to hear all other stations because it constantly listens to the shared resource, namely the bus. When faulty station J is observed, the neighboring stations, as detailed below, would patch out station J such as shown by chord segment 28 and thus the token would be passed from station I to station K, bypassing faulty station J. If at a later time station J became operational it could, through a demanding sequence, reestablish its presence on the token list, and thus the overall list would again have the shape shown by the circle 27 in FIG. 1.

So a key aspect of the present invention is the concept that each station which has token access capability embodies similar sets of rules which can be considered the formulation of states with the change of states being dependent upon how the rules are formulated in response to observed events (primitives), and in which the overall communication system operates in a synchronized fashion. The resulting synchronized serial bus is an underlying concept of the present communication system. Through it, the capability of a master-less communication system is achieved.

Further to this end is the concept of the arc of control, whereby at any given time after initialization there are three stations which have information concerning the whereabouts of the token, and have the ability to move the token depending upon perceived events. Thus, in FIG. 1, arc 30 represents the token transfer between stations B, C and D. As the arc shows, station owner C is the present token owner, station B is the tail of the arc and was the previous token owner (referred to as the FROM), and station D is the next token owner (referred to as the TO). In the protocol to be described more fully below, the concept of a one-third, two-thirds, three-thirds and four-thirds bus timeout is utilized to insure proper token passing. A time period called T represents three-fourth a dead bus TIME OUT which each station initiates when a token is passed to a new owner. Thus, in the present situation, when token C becomes the token owner (as represented by arc 30), stations B, C and D start their timers. If, after one-third times T station C has not initiated any transmission on the bus, the head of the arc (station D) assumes that something is wrong with station C and then proceeds to take the token; that is, station D assumes that station C has died with the token. Station D then, takes the token, insuring that the token is moved around the token list. If for some reason station D does not realize that station C has not generated a message within the one-third times T time period, the tail station, Station B, will after a time period equal to two-thirds times T, retake the token. If for some reason both the tail station, station B, and the head station, station D, do not take the token though station C is not operating properly, then after a time period equal to T (that is three-thirds times T), the present token owner, station C, if now healthy, retakes the token in an attempt to keep the token moving; that is it passes the token back to itself. If, however, there is still nothing (non-intelligible information) on the bus after a time period equal to four-thirds T, then each station realizes that something is wrong with the entire token passing scheme and thus reverts to the known as initialization in which a token station is found and a new token list is generated.

Thus, it is readily seen that the arc of control wherein each station in the arc attempts to keep the token moving from station to station is a powerful method of obtaining a master-less communication system of a simple and elegant format.

Figure 3:
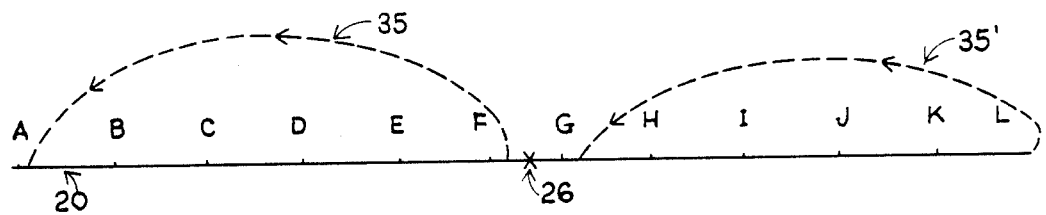
FIG. 3 is a block diagram illustrating how a communication system according to the present invention, having stations A to L passing a single token, can reconfigure itself to pass two tokens between subsets of the original stations when a break in the bus occurs, thereby allowing for each subset to continue operation even though there is a break in the bus.

Before describing the details of a particular communication system utilizing the present invention, reference should be made to FIGS. 2 and 3 to denote several other features of the present invention. Thus, in FIG. 2, and also shown in FIG. 5, a monitor 29 may be utilized and connected to the bus for monitoring the conditions of the bus and stations on the bus. The monitor does not need direct control of the bus nor the stations on the bus but is able to observe the messages on the bus and consequently the state of affairs with respect to the entire communication system. One such use for the monitor is to ascertain the number of stations presently in the token list as well as what the overall access time is between successive token passes to the same station. The monitor may also identify faulty stations due to such signals as their generation of ONLY ONE token passes to themselves as more fully described below.

FIG. 3 illustrates how the present invention can accommodate the situation where a communication system formally in the configuration of FIG. 2 becomes faulty due to a break in the bus 20 such as at location 26. In this case, if the token at the time of the break was resident in station A, B, C, D, E or F, that token would continue to be passed between those stations and thus would loop back as indicated by dotted line 35 (this assumes an initialization). Stations G-L at the same time would perceive the lack of a token and after the bus dead timeout expired, would go into an initialization sequence to reformulate a token list. Thus the token list would be generated and a new token would be passed between stations G-L with the token being looped back from station L to G as shown by line 35'.

If at a later time the bus was repaired thereby removing the break at location 26, the stations would immediately ascertain that illegal messages were being transmitted on the bus due to the fact that there would initially be two tokens present and thereby two stations initiating high level messages. Due to these "illegal" messages being generated, or by the stations retry times reaching maximun the stations would enter what is known as a BUS IS DEAD state and re-initialize the token list thereby forming a single token list with stations A-L being in the token list is desired. Thus, the communication system would revert back to what is shown in FIG. 2 with the loop back of the token going from station L to station A as shown by line 35". It is therefore readily seen that the present invention accommodates not only the condition of faulty stations, but also the condition of a faulty bus.

In order to better observe the token passing format generated by the arc of control concept utilized with a synchronized serial bus responsive to perceived events or primitives, reference should now be made to a state map shown in FIGS. 17A-17D and corresponding Tables 1-14, further in conjunction with FIGS. 6-16 which describe a particular communication system utilizing the underlying principles of the present invention.

In FIGS. 17A-17D, each circle represents a state which any particular station can be in at any particular time. It should be realized that each station is in some state but that not all stations are in the same state at the same time. Thus, when reviewing FIGS. 17A-D, it must be realized that a particular station is moving from one state to another depending upon particular perceived events by that station and that simultaneously, other stations are moving between potentially different states due to their perceived events. Each station may indeed be observing different events at the same time. This is due in part to propagation delays on the bus; that is, that the propagation of information is limited to approximately 0.7 times the speed of light and therefore not all stations "see" the same information simultaneously. It is also due to noise which can exist on the bus.

If one assumes that a token list already exists and that the tokens are being passed from station to station, the token pass message sequence can be described. This is one of the more straightforward message sequences, and it is therefore presented now although in actuality an initialization message sequence must occur before a token list can be generated.

Figure 6:
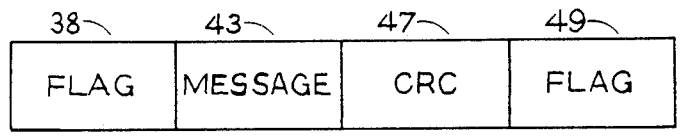
FIG. 6 is a diagrammatic representation of the envelope of information transmitted by stations of the communication's system including the use of a first FLAG, a MESSAGE, a CRC error detection frame and a second FLAG.
Figure 7:
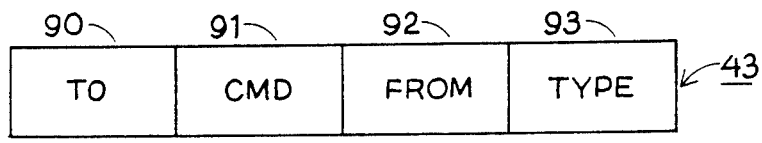
FIG. 7 is a diagrammatic representation of a four byte message format for messages sent in the envelope shown in FIG. 6 illustrating that it contains a TO section designating an address typically from 1 to 255 or if equal to 0 for a broadcast address to all stations, a CMD field which comprises the high level data link controller command field for HDLC messages, and when access messages are transmitted, a C8 data frame in hexadecimal form, the FROM signal indicating the source address, typically a number from 1 to 255, and the TYPE field indicating the type of message being sent for access control.
Figure 8:
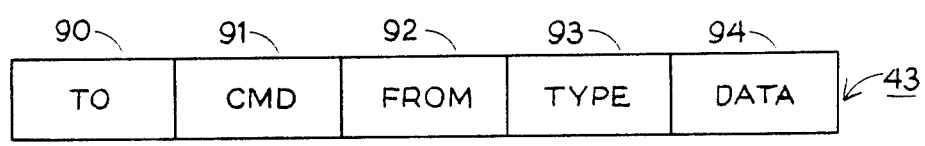
FIG. 8 is a diagrammatic representation of a five byte message field which, in addition to the fields shown in FIG. 7, further has a DATA field which is used for certain types of access messages, namely when a station is in a WHO's NEXT or a LOAD YOUR TO FROM state.

The message format is shown in FIGS. 7 and 8 forming part of the overall data packet shown in FIG. 6. The data packet transmitted on the bus comprises four parts: a first flag field 38, comprising the bit pattern 01111110, a message 43 comprising four or five bytes, a CRC field 47, comprising a 16 bit frame check sequence, and a second flag 49, comprising the same bit pattern as the first flag.

The message formats are shown in FIGS. 7 and 8. The first byte 90 comprises the destination station address for the message, which in the preferred embodiment would be a number between 1 and 255. A zero in this byte represents a broadcast message to be potentially responded to by any station. The second byte 91 is the CMD field which is the high level data link command field which always transmits a value equal to C8 in hexadecimal format for access messages. The third byte 92 is the FROM byte and gives the address for the sending station. The fourth byte 93 is the TYPE byte and indicates the particular message being sent. These message types are described in Table 1.

Figure 17A:
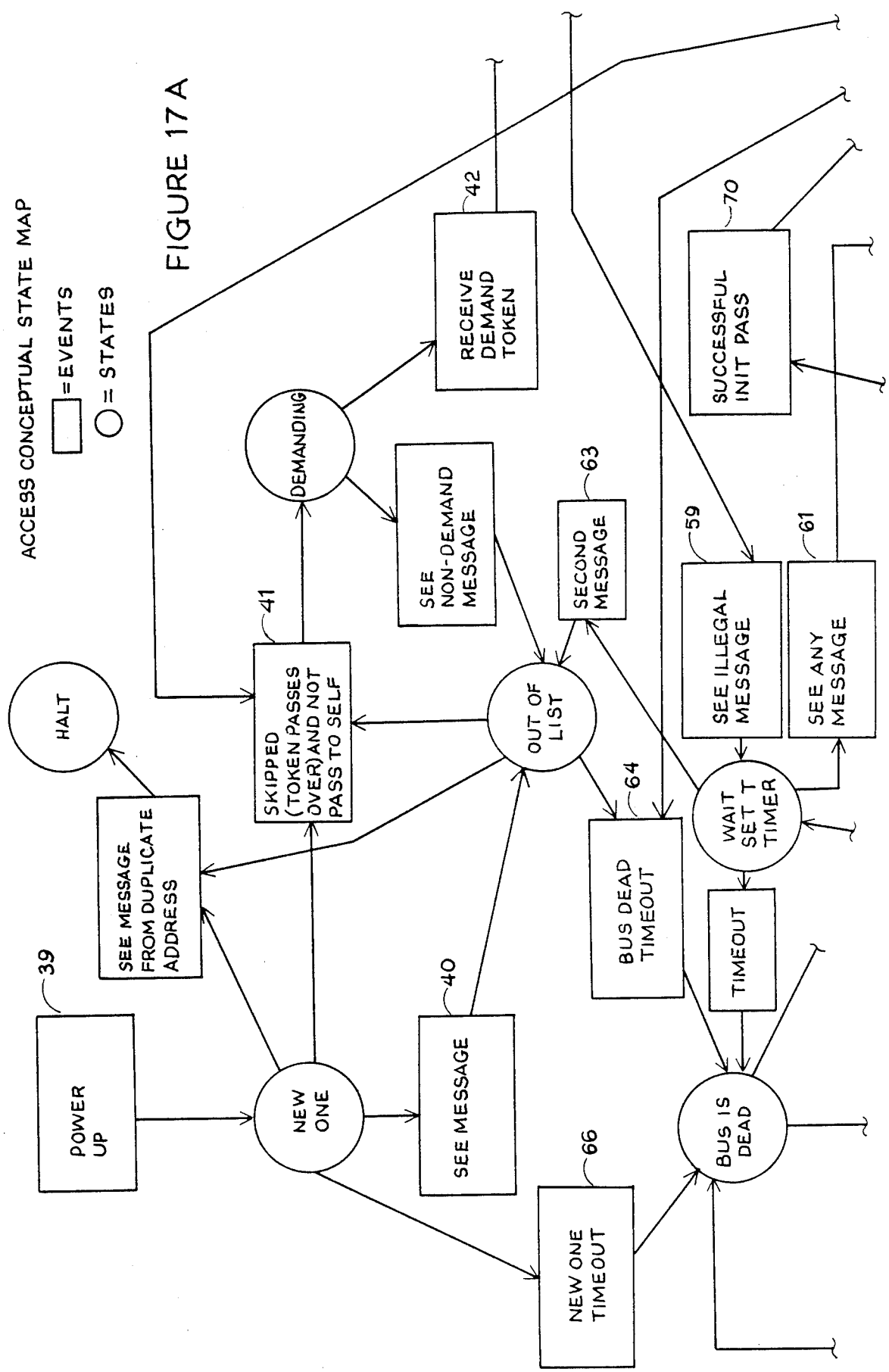
FIGS. 17A–17D, is an overall state map for implementing a typical local area network communication system according to the present invention.
Figure 17B:
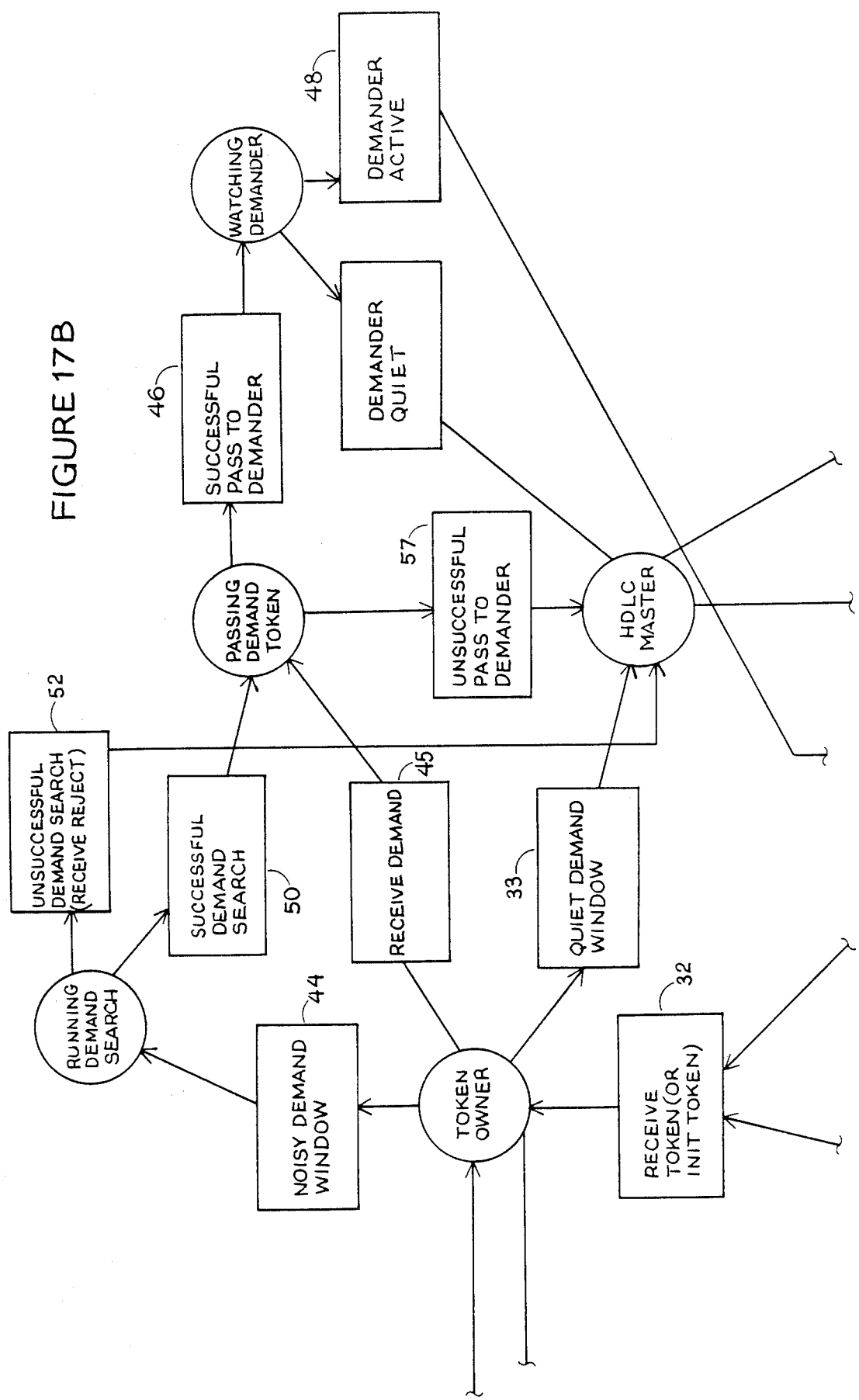

The fifth byte 94 shown in FIG. 8 is for certain access messages ("who's next" and "load your TO FROM") where an address needs to be passed from one station to another. Referring to FIGS. 17A-17B, it can be assumed that some station, such as station A shown in FIG. 1, is the current token owner (token and baton are used synonymously in the figures and tables). The first step for passing the token is for station A to pass a token enable signal (signal BE, see Table 1) to its TO station; that is, station B.

TABLE 1

Figure 17C:
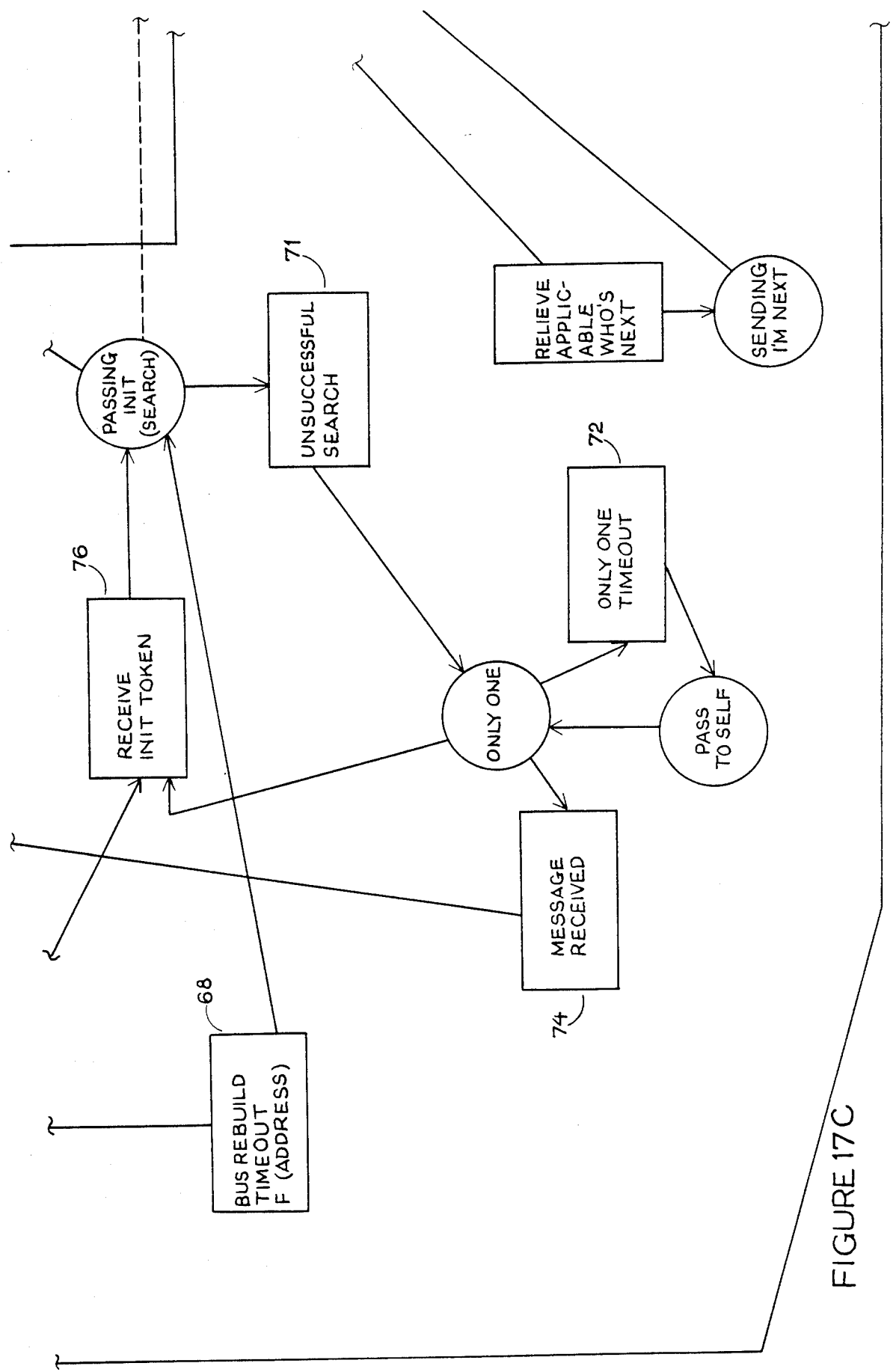
Figure 17D:
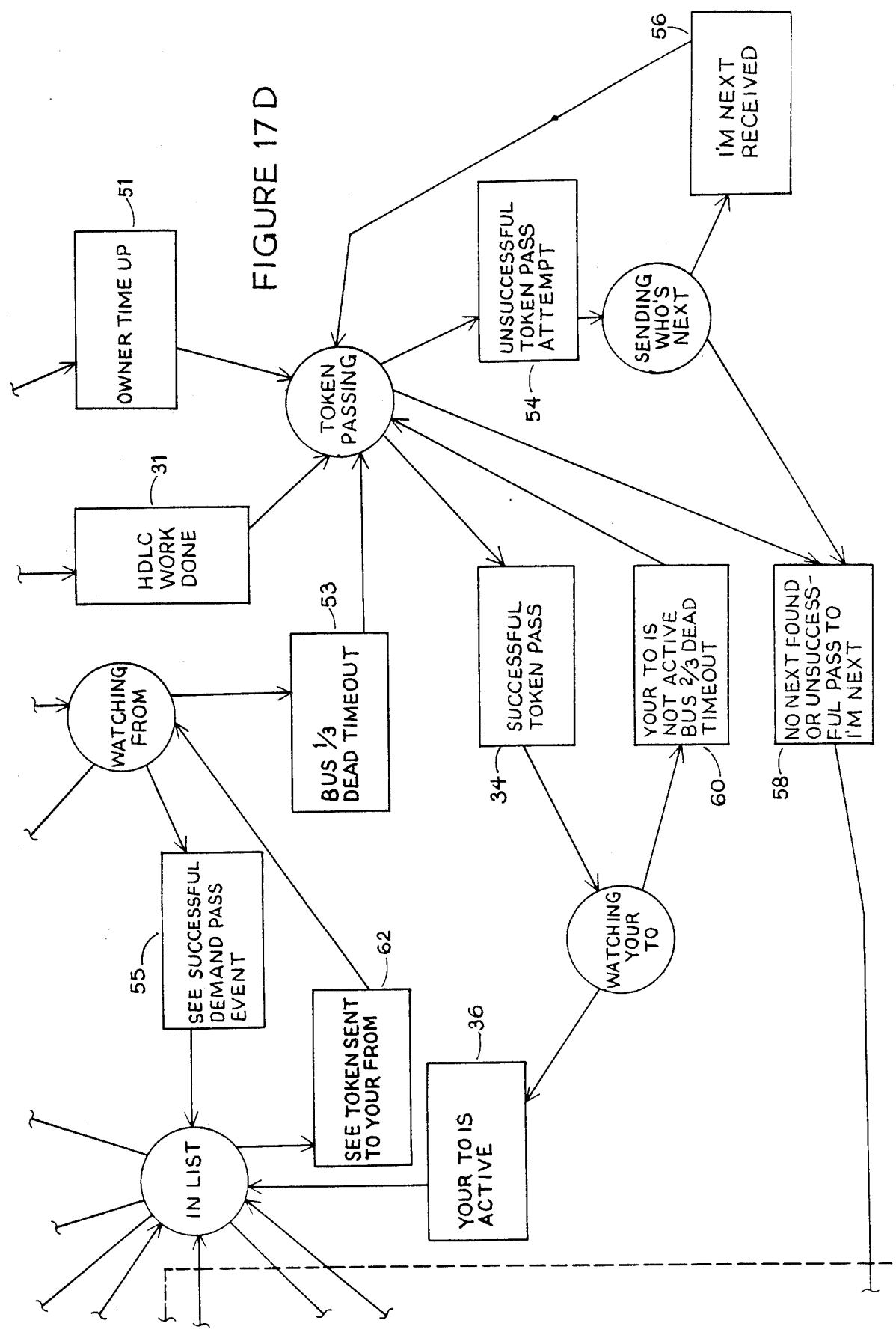
Figure 17E:
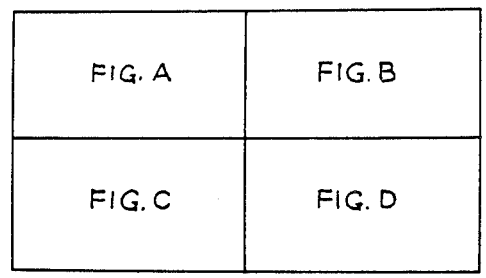
FIG. 17E is a diagram showing how

| ACCESS MESSAGE TYPE FIELD | | | |
|---|---|---|---|
| Message | Symbol | Length | Hex Code |
| Initialization token enable | IBE | 4 | 11 |
| Initialization token acknowledge | IBA | 4 | 12 |
| Initialization token | IBT | 4 | 13 |
| Token enable | BE | 4 | 21 |
| Token acknowledge | BA | 4 | 22 |
| Token | BT | 4 | 23 |
| Demand token enable | DBE | 4 | 31 |
| Demand token acknowledge | DBA | 4 | 32 |
| Demand token | DBT | 4 | 33 |
| Load your TO | LYT | 5 | 51 |
| Who's next | WN | 5 | 61 |
| I'm next | IN | 5 | 62 |
| Reject | ARJ | 4 | F0 |
| Load your FROM | LYF | 5 | 52 | station B would then respond with a token acknowledge signal (BA) which when received by station A would cause station A to send the token signal (BT) to station B. At this time station B would become a token owner and station A would enter the watching your TO state (FIG. 17D).

Thus for a typical token pass from one station to another, the following typical steps would occur as set forth in Table 2. Table 2 should be viewed with reference to FIG. 10 wherein the steps denoted as one through eight in Table 2 are indicated along the right-hand portion of FIG. 10. Similar step numbers appear for Tables 3-8 and corresponding FIGS. 11-15 and 9 respectively. It is thus seen by combination of Table 2 and FIG. 10 that first the token owner (station 10) sends a token enable signal to his TO station of record (station 15). That is the present token owner knows the next station that is supposed to receive the token in the token list (FIG. 1). It thus sends a signal to that token owner (through the unique addressing of each station) to tell that station that it is about to receive the token. The TO station responds with a token acknowledge signal. Referring to FIG. 1, if station A is the present token owner, station B would be station A's TO. Thus station B upon receiving the token enable signal generates a token acknowledge signal. Station A would then generate a token signal which in effect sends the token to station B. The new station owner will then listen for a period of time equal to 50 microseconds to allow potential demanders to signal it. This ability to allow demanders to interrupt the new token owner during the token pass provides for the ability of new stations to be patched into the token list. Another way of looking at this sequence is that when the token is passed from one station to another, the station receiving the token (station 15 in FIG. 10) has a window of time during which it listens for outside interrupts and, if properly received, will relinquish the token to an interrupter (a demander) which results in the ability to add to the token list. This will be further described below.

TABLE 2

Token Pass

1. Token owner sends token enable signal to his next (his TO) of record (see Table 1).
2. Receiver of enable responds with a token acknowledge signal.
3. Token owner sends token.
4. New token owner listens 5∅ u-sec to allow potential demanders to signal him.
5. Token owner sends any HDLC messages he might have queued, waits for response if necessary.
6. Token owner holds token less than a fixed minimum ownership.
7. Token owner passes to his next (his TO).
8. There is a provision to shift to a single message token pass (omitting steps 1,2) if a long sequence is executed without error (such as 16 sequential error-free passes).

The next step in the token pass message sequence is that the new token owner (station 15) sends any high level data link control message the station might have queued for transmission in its data communication module to some other station and waits for responses (if necessary). It should be noted that the overall time that a particular station owns the token is at least equal to some maximum period of time which is equal to the maximum propagation delay on the bus (time to go from one end of the bus to the other) plus the amount of time required for a station to receive a request for information, to assemble information and then proceed to transmit it (the response time of the receiving station for preparing and sending data). This overall time is typically two to ten milliseconds for a typical length bus of 15,000 feet. Indeed for a 15,000 foot bus, the frequency for data transfer on the bus is selected at 1.544 megahertz (a multiple of a standard communications frequency) which for the typical propagation speed of 0.7 times the speed of light for the bus, provides that the entire message transmitted by any station does not completely rides on the bus; that is, the amount of time given a station to send a message is such that discrete packets of the messages cannot individually ride on the bus simultaneously. However for higher speeds and greater distances, whole messages can reside on "part" of the bus.

Typically, the maximum amount of time that a station may own the bus varies depending upon the particular needs of the station. Thus typical token ownership times would vary from 2 to 10 milliseconds. Due to the fact that each station has a maximum token ownership time and since the number of stations in the token list can be ascertained, the concept of a guaranteed access time is achieved. Thus, in a simple example where four stations are in the token list, if the stations respectively have a 10 millisecond, a 2 millisecond, a 3 millisecond and a 5 millisecond token ownership time respectively, there would be a 20 millisecond guarantee access time. That is, within 20 milliseconds each of the four stations would have ownership of the token if the token is being passed successfully. It should be noted that if a station completes its HDLC messages (including any responses thereto) within a time period less than its token ownership time, the station immediately proceeds to pass the token to its TO station. This is pointed out in steps 6 and 7 of Table 2 and illustrated in FIG. 10.

Finally, it should be noted as set forth in step 8 that the access steps (steps 1 through 3) can in some circumstances be reduced to a single step; namely, a token pass as shown in step 8. This represents a change in the handshake protocol between the station owner and its TO station when token passes between the stations have consecutively occurred without error for some predetermined number of passes, typically sixteen. Thus, it is assumed that if such passes are error-free for this predetermined number, that it is not necessary to go through the handshaking procedure other than for the token owner to tell the TO station that it is receiving the token. This saves time and thus provides for a more efficient utilization of the bus provided that the error-free passes have occurred before this change in token passing occurs. This automatic change in the token pass handshaking between the present owner and its TO station represents an underlying concept of the present communication system's invention. It should be noted that although not specifically shown in the drawings, it is possible for a further step to take place if error free token passes have occurred for a sufficiently large number of passes; namely, to pass the token by the absence of any signal from the present token owner. This in essence is a virtual token pass and represents a further improvement in the efficiency of use of the bus. In order to do this, it is necessary that all stations support the virtual token pass protocol.

The token pass message sequence can also be visualized with reference to FIGS. 17A-17D. Thus, if we assume station A to be the token owner, station A is in the token owner state shown in FIG. 17B. Assuming it saw a quiet demand window, event 33, it goes into the HDLC master state. This is the state in which the station transmits and has returned to it high level data link messages over the bus. It is at this state that station A resides as it gets ready to pass the token to station B. Thus, after station A completes its HDLC work, event 31, or if its token timeout period has expired, event 51, station A enters the baton passing state shown in FIG. 17D. If a successful token pass is achieved, event 34, station A goes into the "WATCHING YOUR TO" state (FIG. 17D) and if it observes that station B is active correctly (that is that it has accepted the token), event 36, station A then enters the IN LIST state shown in FIG. 17B. If station A on WATCHING YOUR TO state observes incorrect or no activity by station B, station A may recover the token and retransmit the token to station B.

Similarly, from station B's perspective, when station A receives the token, event 62, station B goes from the IN LIST state to the WATCHING ITS FROM state (see FIG. 17D). When station A completes its HDLC work, event 31, station B receives a token signal, event 32, and thus proceeds to the TOKEN OWNER state while station A completes the TOKEN PASSING state. This transfer from the WATCHING FROM state to the TOKEN OWNER state requires the handshaking as enumerated in Table 2 steps 1-3 or step 3 only depending upon the handshaking protocol utilized. Thus there is in essence a series of substates which are not shown in FIGS. 17A-D which take place when this particular event occur.

Station B if it receives a quiet demand window, event 33, similarly will enter the HDLC master state and proceed to transmit any high level messages which it may have queued in its transmit buffer in the communication module 25 (FIG. 2). Upon completion of the transmission of its messages or upon the expiration of its token ownership time slot, station B then attempts to pass the token to its TO station, namely station C, and if a successful token pass occurs, event 34, station B enters the WATCHING YOUR TO state. When in the WATCHING YOUR TO state, station B if it notices that station C becomes active within a time period less than one-third the bus timeout period ($\frac{1}{3}$T) (known as a message timeout, 100 $\mu$sec) will realize that station C has not only received the token but has become active (the event your TO is active occurring, event 36) and then will proceed to move to the IN LIST state where it will reside until it again sees that station A has received the token. At that time, event 62, will be perceived and station B will enter the WATCHING FROM state to repeat the cycle.

The other stations shown in circle 27 of FIG. 1 would be in the IN LIST state. Stations G' and G" would, since not part of the token list, be in the OUT OF LIST state (FIG. 17A).

The above description of token passing assumes that each station correctly receives the access messages from its FROM and TO stations, and that everything is working in a pristine error-free environment. Further on, discussion concerning the particular states that are entered depending upon perceived errors by the stations is discussed. In order to obtain the desired communication system it is disclosed that the failure of any single station will not cause the overall communication system to stop functioning. Furthermore, the capability of the present invention provides for the reinitialization of a token list depending upon certain perceived events, including multiple station failures and failure in the communication medium, namely the bus.

Figure 10:
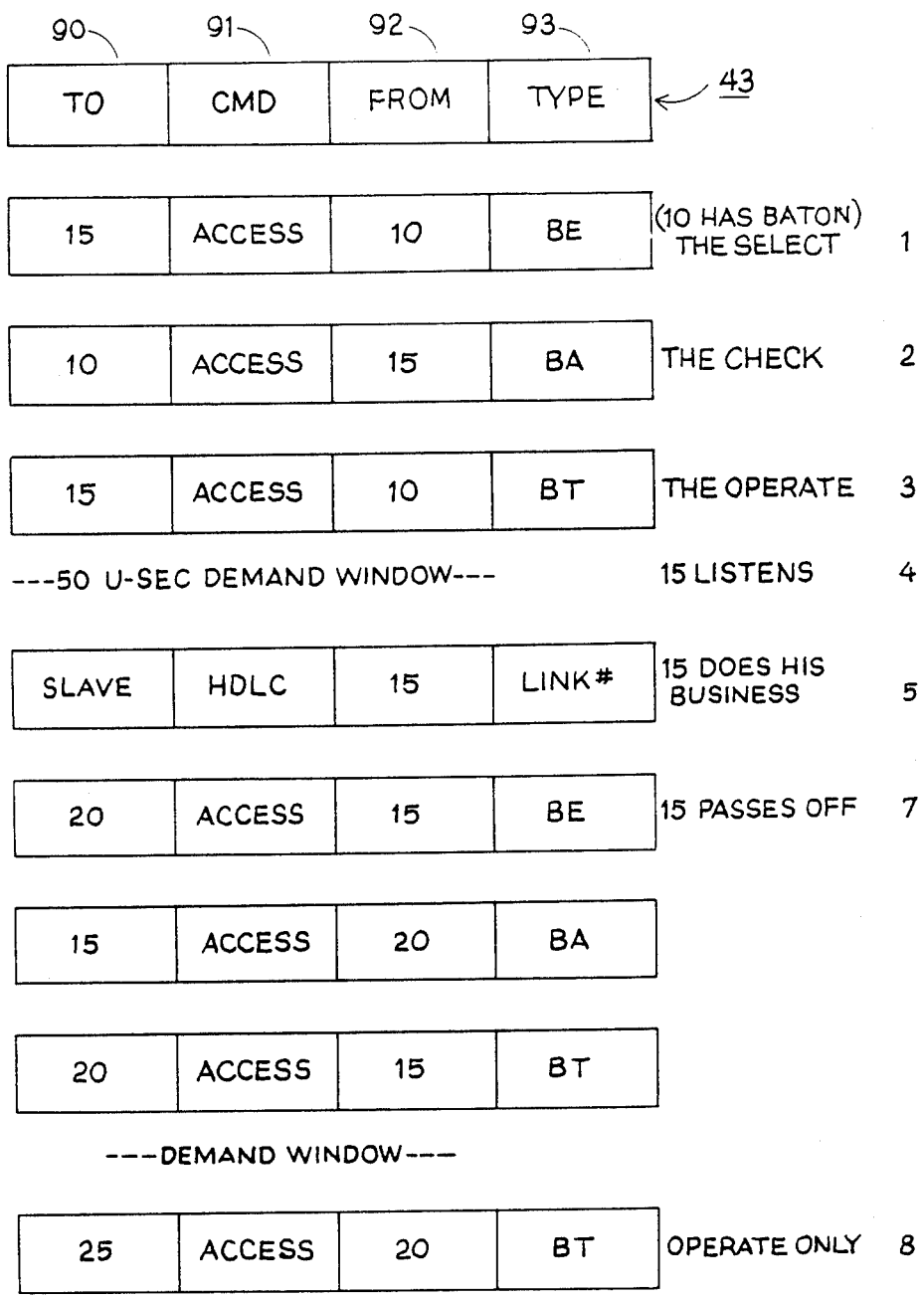
FIG. 10 is a diagrammatic representation of typical messages which would be sent in a token pass access message sequence.

Before leaving the token pass description, reference should be made to FIG. 10 to see the types of access messages which are communicated between the stations in the arc of control (namely the token owner station, its FROM and its TO stations) in order to fully appreciate the technique involved. At the top of FIG. 10 is seen the first access message which refers to station 10 sending a token enable signal to station 15. This is the first step in the token pass handshake protocol. The second message is also an access message in which station 15 sends back to station 10 a token acknowledge signal indicating that it has received the token enable signal correctly. The third message is again a token access message in which station 10 sends to station 15 the token and thus provides that station 15 will now have the token for its own use. Station 15 must wait and see a quiet demand window (event 33 in FIG. 17B) which in this particular case is set at a 50 microsecond duration. If station 15 does not receive any message during the demand window, it perceives it as the quiet demand window 33 and then enters the HDLC master state which is shown as the fourth message. That is, at this point, station 15 has access to the bus by virtue of its ownership of the token. In this case, station 15 sends any message it desires to a slave station, which in this situation means a station that it desires to transmit data to and need not be a slave in the sense that it does not have token access capability in its own right. The message which it sends is described as link #, which simply means that station 15 is using a high level data link communication protocol of any type wellknown in the art.

The next message sequence is again an access message in which station 15 sends to its TO, namely station 20, a token enable signal. Station 20, if it receives this token enable signal correctly, proceeds to send to station 15 an access message of token acknowledge which in turn will cause station 15 to send the token to station 20 as shown in the penultimate message of FIG. 10. Another demand window will occur in this case for station 20. If for some reason station 20 has no HDLC message to send, it would then proceed to a token pass of its own. However, it should be noted that if token passing between stations is performed in a clean error-free manner for a predetermined number of passes, such as sixteen, the handshake protocol between the stations for passing the token can be streamlined and thus provide for a quicker passing of the token. This is shown in the last message of FIG. 10 wherein station 20 sends the token message to its TO station, station 25, without first sending the token enable signal (BE) nor requiring the receipt of the token acknowledge signal (BA) from station 25 before sending the token (signal BT). This automatic adjustment in the handshaking protocol achieves a more efficient use of the bus by the interconnected stations. It should be noted that different stations on the bus may be using different token pass handshake protocols at the same time and it is only those stations which are passing the token between themselves in an error-free manner that switch to the faster or streamline token pass handshake protocol. Of course, if these stations perceive an error when in this high-speed token pass protocol, they will revert back to the more rigorous handshake as described in steps 1-3 of Table 2.

The next access message sequence to be described is known as demanding. Demanding is the ability of a station which has token access capability to request entry into the token list or at least temporary entry onto the bus (owning the token for at least one pass). Prior to demanding such a station is in the out-of-list state (see FIG. 17A). For some reason, this station (such as station G' shown in FIG. 1), perceives the necessity to own the token either on a temporary or permanent basis. A station can enter in the out-of-list state due to the fact that upon power-up, event 39, it entered the NEW ONE state which after seeing a message, event 40, realizes that the communication system is operating, that is, that the bus is active.

However, if station G' realizes that the token has passed over it, event 41 (FIG. 17A) such as station G having the token and the token then passing to station H as shown in FIG. 1, and if station G' desires to be in the token list, station G' enters the demanding state (FIG. 17A). At this point, station G' waits for demand window, sends a demand token acknowledge message to the token owner that is observing the demand window of the token owner having an address closest to G' but higher than G' (this would be station H). The token owner (station H) then sends a demand token enable signal to the demander and the demander responds with a demand token acknowledge signal. The demand token then passes to the demander causing the demander (station G') to become the token owner and enter the TOKEN OWNER state (FIG. 17B). Thus the receipt demand token, event 42 shown in FIG. 17A, actually represents a series of signals transmitted between the new token owner and the demanding station which upon proper handshake protocol (similar to the handshake protocol with respect to token passing between token owners in a list), results in a demand token being transferred from the new token owner, (station H) to the demander (station G').

In the above case, it should be noted that only stations between the addresses of the new token owner and the previous token owner can demand the token where each station's FROM must be at an address less than yours (or at the highest address of all token list stations if your are at the low end of the addresses, see the looping line 35'' in FIG. 2) and that your TO must be at an address greater than yours (or at the lowest address of all token list stations if you are at the high end of the address).

The new token owner (station G') thus in turn listens to its demand window to see if anyone else is demanding the token. This situation is known as a multiple demand and can only occur when more than one station demanded the token from station H at the same time. However if that did occur, station G' would attempt to find the other demanding station which would have an address sequentially lower than that of G' and pass the token to this station as will be more fully described below with respect to the multiple demander situation.

If however, the new station owner (G') receives a quiet demand window, event 33, it informs its predecessor station (station G) to "load its TO" with the address of G' and informs its station (H) with a load your from with the address of G' and thus patches in its address into the token list. G' knows its own TO station (namely station H) and thus the list is patched with the correction of station H's information as to its FROM station (namely G') being substituted for its previous FROM station G.

Figure 11:
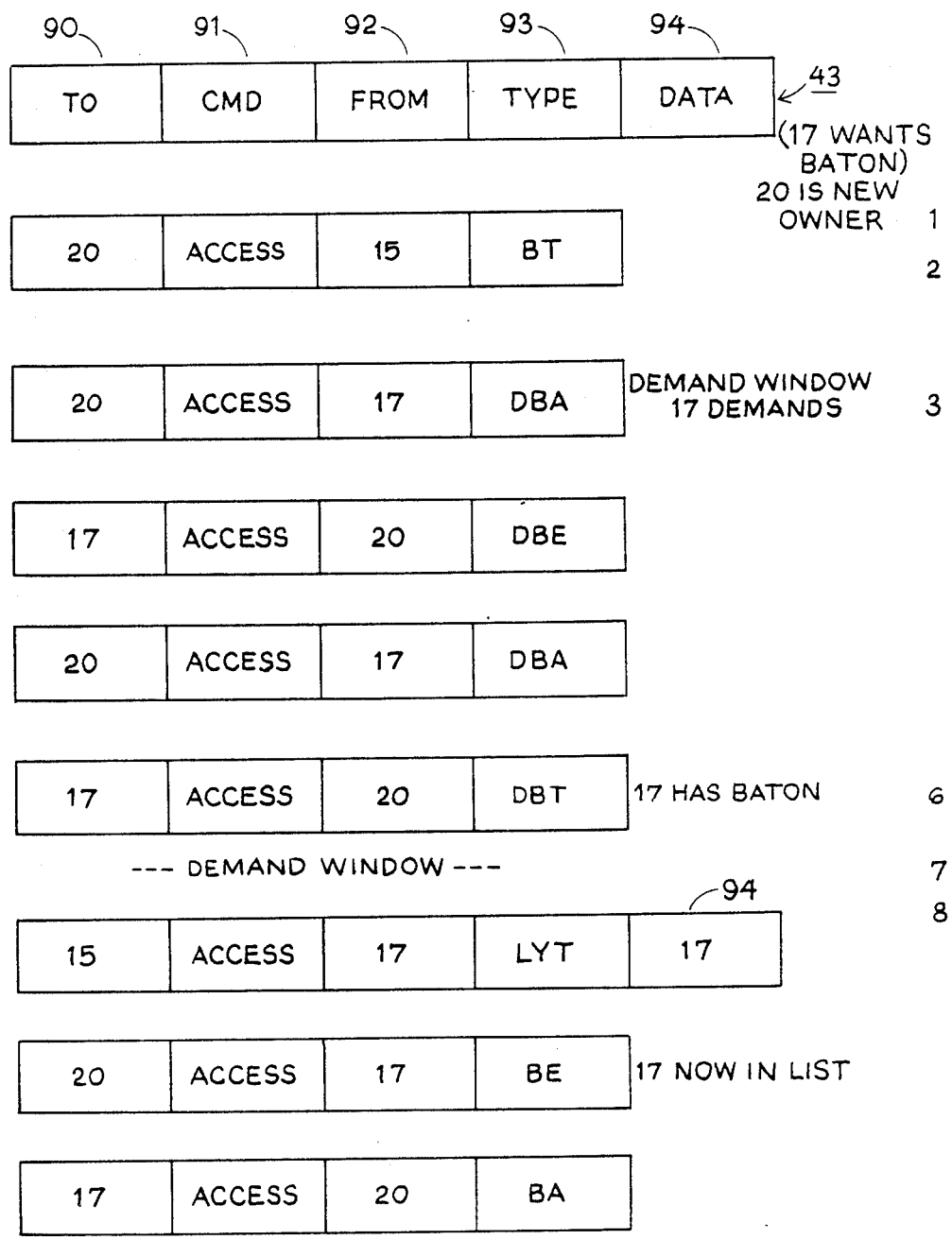
FIG. 11 is a diagrammatic representation of typical messages sent in a demand access message sequence.

Table 3 in combination with FIG. 11 goes through a detailed explanation of the demanding message sequence. Thus there are 8 steps shown in Table 3 and corresponding FIG. 11.

In step 1, station 20 receives the token from station 15 in a token access message. Station 17 however wishes to become part of the token list and since it resides at an address between station 15 and 20, it demands access when station 20 receives the demand token. Thus, step 3 shows station 17 issuing a demand token acknowledge signal to station 20. Station 20 at step 4 then sends a demand token enable signal to station 17, which at step 5 sends a demand token acknowledge signal to station 20. Station 20 then sends the demand token to station 17 at step 6.

It should be noted that steps 1-6 for passing the demander token are all access messages. Station 17 then has its own demand window (for only seeing noise on the bus if station 17 was the sole demander) and if this window is quiet (no noise) it sends a LOAD YOUR TO signal to the predecessor station from step 21, namely station 15. This is thus a five byte access message since the fifth byte tells station 15 that its TO station is now station 17 rather than 20. Station 17 also sends a LOAD YOUR FROM signal to the next station, (20), this is also a five byte access message.

TABLE 3

Demanding

1. Token master perceives necessity to demand because of:
    (a) power up onto active bus
    (b) does not get token for x time
    (c) higher level of software signals requirement (part time owner)
2. Potential demander sees (normal) token pass over him.
3. Demander sends a demand token acknowledge message to new token owner during demand window (alternate use this type)
4. Token owner sends demand token enable to demander.
5. Demander responds with demand token acknowledge.
6. Demand token passes to demander.
7. New owner listens to bus for another demand window.
8. If quiet new owner sends "Load Your To" to the predecessor, and Load Your From to the next (saved from step 2 above).

Following step 8, station 17 after its HDLC messages are completed or after its token ownership timeout has occurred, sends a token enable signal to its TO station, namely station 20. Station 20 then sends a token acknowledge signal to station 17 to initiate the token pass to station 20. At this time, station 20 realizes that its FROM station is no longer station 15 but station 17 and thus the patch in of station 17 into the token list is completed.

From the point of view of the station receiving a demand, that station would previously be in the TOKEN OWNER state (FIG. 17B). Upon receiving a demand from a demander, event 45, it enters the PASSING DEMAND TOKEN state. If a successful pass to the demander occurs, event 46, it enters the WATCHING DEMANDER state where, if the demander becomes active, event 48 causes the former token owner to enter the WATCHING FROM state. While in the WATCHING FROM state it in essence watches the demander which has received the token. If a one-third T timeout occurs, event 53—that is that the demander has not transmitted on the bus within a prescribed period of time—the former token owner enters the token passing state to pass the token to its TO station.

If however the former token owner sees that the demander has successfully done a demand token, event 55, it enters the IN LIST state.

Referring again to FIG. 17B if the token owner sees a demand, event 45, it enters the PASSING DEMAND TOKEN state. If instead of receiving a successful pass to the demander an unsuccessful pass to the demander occurs, event 57, the token owner instead of passing the token to the demander will instead enter the HDLC MASTER state. Here it issues any high level data link messages which it may have queued in its data communication module.

It should be noted that station 17 could equally have demanded the token from station 20 without requiring entry into the token list. In this situation, station 17 would be known as a temporary demander and once it received the token from station 20 would not send the load your TO signal (step 8) to station 15 but would leave station 15 with its TO address equal to that of station 20. Consequently on the next pass of the token, station 15 would pass the token to station 20 leaving station 17 out of the token list.

In the next situation, more than one station is demanding the token simultaneously during a demand window of a station receiving the token. Thus in the above example, when station H in FIG. 1 receives the token from station G, station G' and some other station, such as station G'', may simultaneously demand the token from station H. In this case, the token owner when in the token owner state shown in FIG. 17B receives a noisy demand window, event 44, instead of a clean demand window, event 33. Thus instead of station H going to the PASSING DEMAND TOKEN state, shown in FIG. 17B, it would enter the RUNNING DEMAND SEARCH state shown in FIG. 17B. If when in this state a successful demand search is completed, event 50, station H would enter the PASSING DEMAND state. Upon successful passing to the demander, event 46, station H would enter the WATCHING DEMANDER state which if the demander becomes active, event 48, would cause station H to enter the WATCHING FROM state. Station H would then be able to become another token owner upon receiving the token enable signal from the demander. Thus, a successful demand search, event 50, causes station H to proceed through the states which it would have proceeded through had it only received a single demand during the demander window. If however station H after receiving a noisy demand window, event 44, then performs an unsuccessful demand search, event 52, it will instead revert to the HDLC master state, and thus continue to own the token and send out any HDLC messages which it has queued in its data communication buffer.

Figure 12:
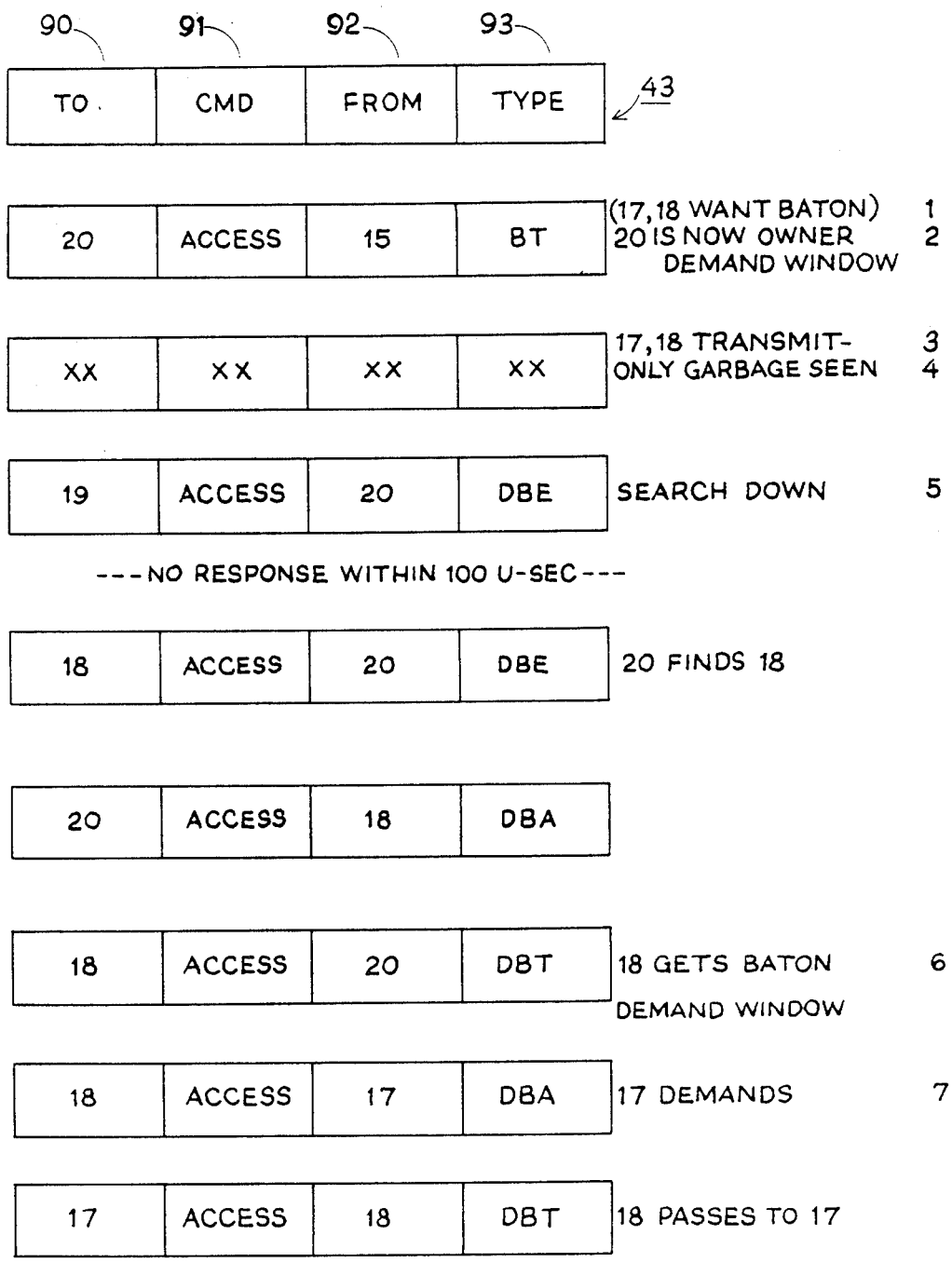
FIG. 12 is a diagrammatic representative of typical messages sent in a search access message sequence.

A thorough discussion of the multiple demander message sequence is set forth in Table 4 and corresponding FIG. 12. Thus as shown in Table 4, FIG. 1 indicates that two or more token masters, that is stations which have token access capability but are in the OUT OF LIST state (see FIG. 17A), decide to demand the token. The token is then seen as passing over these two stations, event 41. In FIG. 12, station 15 is the present token owner sending the token to station 20. Since since stations 17 and 18 are the stations which want the token, and since station 20 is the new token owner, it has a demand window upon receipt of the token. Thus during the demand window, stations 17 and 18 transmit their demand token acknowledge message to token owner 20. However, since stations 17 and 18 transmit their token acknowledge messages at the same time, the modem at station 20 merely perceives energy on the bus which is interpreted by station 20 as a noisy demand window, event 44, forcing station 20 to enter the running demand search state (FIG. 17B).

Thus, step 4 has occurred and step 5 results where station 20 searches for demanders. A search mechanism embodies searching for addresses of stations between it and its FROM (namely station 15). It thus sends a demand token enable signal to station 19 in its search down (step 5). No response is received for 100 microseconds (two times the demand window) and thus station 20 perceives that station 19 is not a demander. It thus sends a demand token enable signal to station 18 and then finds station 18 responding with a demand token acknowledge signal. Station 20 then sends a demand token signal (DBT) to station 18 which gives station 18 the token. Station 18 then has a demand window at which time station 17, one of the original demanders, sends a demand token acknowledge signal to station 18 requesting the token.

TABLE 4

Multiple Demanders

1. Two or more token masters decide to demand.
2. Token passes over two or more.
3. All skipped demanders transmit.
4. Token owner sees energy but no valid message.
5. Therefore, he searches down.
6. Passing demand token to first demander located.
7. Others then demand from demand token receiver.
8. "Load Your To" sent only by lowest of new masters (demanders).

This corresponds to step 7 of Table 4. Station 18 then sends a demand token signal to station 17, thus passing the token to station 17. At this point, though not shown in FIG. 12, station 17 would send a LOAD YOUR TO signal to station 15 since station 17 is the lowest address station of the new token masters. This corresponds to step 8 in FIG. 11. Then station 15 realizes that station 17 is its new TO station rather than station 20. Station 17 will then proceed to pass the token to station 18 which will record its proper FROM and TO stations and subsequently station 18 will pass the token to station 20 to complete the patching of stations 17 and 18 into the token list.

Another commonly incurred message sequence of the communication system according to the present invention is called WHO'S NEXT. In this situation, the station which has the token sends a token enable signal (signal BE) to its TO station of record, but gets no response from the TO station. This event should be distinguished from the situation where the present token owner sends the token to its TO station, the TO station properly receives the token through the token passing handshaking protocol (whichever one is used) and then fails to transmit a HDLC message within a prescribed period, and also fails to pass the token to its TO station. In the present situation the token owner sends a token enable signal to its TO station and the TO station does not acknowledge that signal. The present token owner will retry to pass the token some number of times, typically three times, and if unsuccessful in passing the token to its TO station, the present token owner will assume that its TO station is faulty and will therefore pass the token to the next station in the token list. The result is that the faulty TO station will be patched out of the token list and will only be able to come back into the token list if it is operating properly and goes through a successful demander message sequence such as described above. In FIG. 17B, if station A (FIG. 1) is in the token passing state, and if it is unable to pass to station B, the unsuccessful token pass attempt, event 54, would have occurred. Station A would then enter the WHO'S NEXT state which if an I'M NEXT RECEIVED signal, event 56, is received by station A from another station in the token list (such as station C which is the next sequential station to receive the token after station B) causes station A to go back to the TOKEN PASSING state. Station A will then pass the token to station C rather than to station B. If however station B does not receive an I'M NEXT RECEIVED event it will determine that there is no NEXT station found and thus an unsuccessful pass to I'M NEXT would have occurred, event 58. This will cause station A to enter the BUS IS DEAD state (FIG. 17C) which will in turn cause the overall communication system to enter an initialization message sequence which will be described later on. Alternatively, station A could enter the passing initialization search state (FIG. 17A) if the states are reconfigured that way. This change in the rules which therefore gives rise to different states occurring upon different perceived events by each station is an example of the versatility of the underlying concepts embodied in the present invention.

Figure 13:
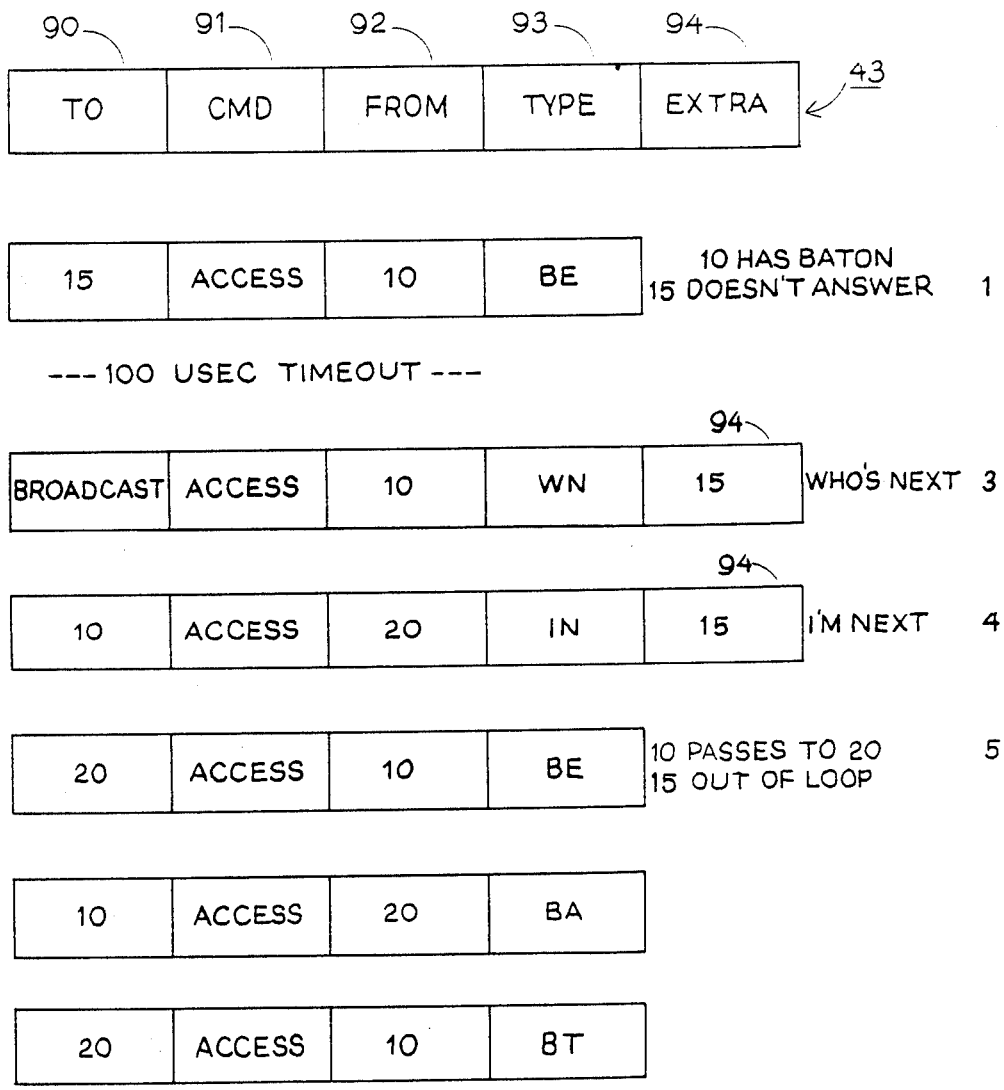
FIG. 13 is a diagrammatic representation of typical messages sent in a who's next access message sequence.

Table 5 in conjunction with FIG. 13 details the specific messages generated in the WHO'S NEXT message sequence. All of the message types are access messages although some are of the five byte format. In the first step, the master station, that is the station which presently owns the token, sends a token enable signal (BE) to its TO of record but gets no response. Thus in FIG. 13, station 10 sends a bus enable signal to its TO station, namely station 15. Station 15 however does not respond with a token acknowledge signal within a 100 microsecond timeout and thus station 10 again sends a token enable signal to station 15.

TABLE 5

Who's Next

1. Master (present token owner) sends enable to his TO of record but gets no response.
2. Retries 3 times.
3. A "who's next" is sent containing the unanswering address.
4. A station recognizing that their FROM of record is in a "who's next" message responds "I'm next."
5. The dead station is thus patched out of access sequence.

This is step 2 of Table 5 in which station 10 will retry for some predetermined number of times. In the preferred embodiment that is three times. Thus if station 15 does not respond with a token acknowledge signal after station 10 retries three times, station 10 will then send a broadcast WHO'S NEXT signal containing the address of the unanswering station (station 15). This WHO'S NEXT signal is shown in FIG. 3 as a five-byte signal in which the TO address is now a broadcast address because it must be received by all stations on the bus. This address is arbitrarily given the address of $\emptyset$ as described earlier with respect to message formats (see Table 1).

All stations receive this access message and the station which had station 15 as its FROM station will know that something is wrong with station 15 and determine therefore that it is the WHO'S NEXT. In the example shown, station 20, which normally receives the token from station 15, determines that it is the next station and therefore sends an IT'S NEXT signal (IN) to station 10, again indicating that station 15 was station 20's FROM station. Station 10 proceeds to step 5 by sending a token enable signal to station 20 with station 20 acknowledging this signal with a token acknowledge signal and then station 10 passes the token to station 20. Station 15 is thus patched out of the token list.

Another commonly occurring message sequence is known as Token Pickup. In this situation a token is passed from one station to its TO station and then after the token has passed the TO station dies; that is, it fails to transmit a HDLC message or fails to pass the token to its TO station. The state map shows this in FIG. 17B where if we assume station A (shown in FIG. 1) has the token it would first be in the TOKEN PASSING state. Upon a successful token pass, event 34, it would enter the WATCHING YOUR TO state. If an active TO is perceived, that is that the TO station has taken the token and has acted with it by either sending a HDLC message or by passing the token to its TO station, than station A would enter the IN LIST state. However, if when in the WATCHING YOUR TO state station A perceives that its TO station is not active, then the Your TO is Not Active, event 60, would occur resulting in station A entering the TOKEN PASSING state. Then station A would retry to pass the token to station B and if unsuccessful (a situation where station B is defective) it would enter the SENDING WHO'S NEXT state and proceed in a manner described above with respect to the WHO'S NEXT message sequence. Thus station A will retake the token when a time period equal to two-third (T) occurs where T is the period of time by which the present token owner will retake the token and use it for its own purposes. T is selected at 7.5 milliseconds and thus two-thirds T equals to 5.0 milliseconds.

Figure 14:
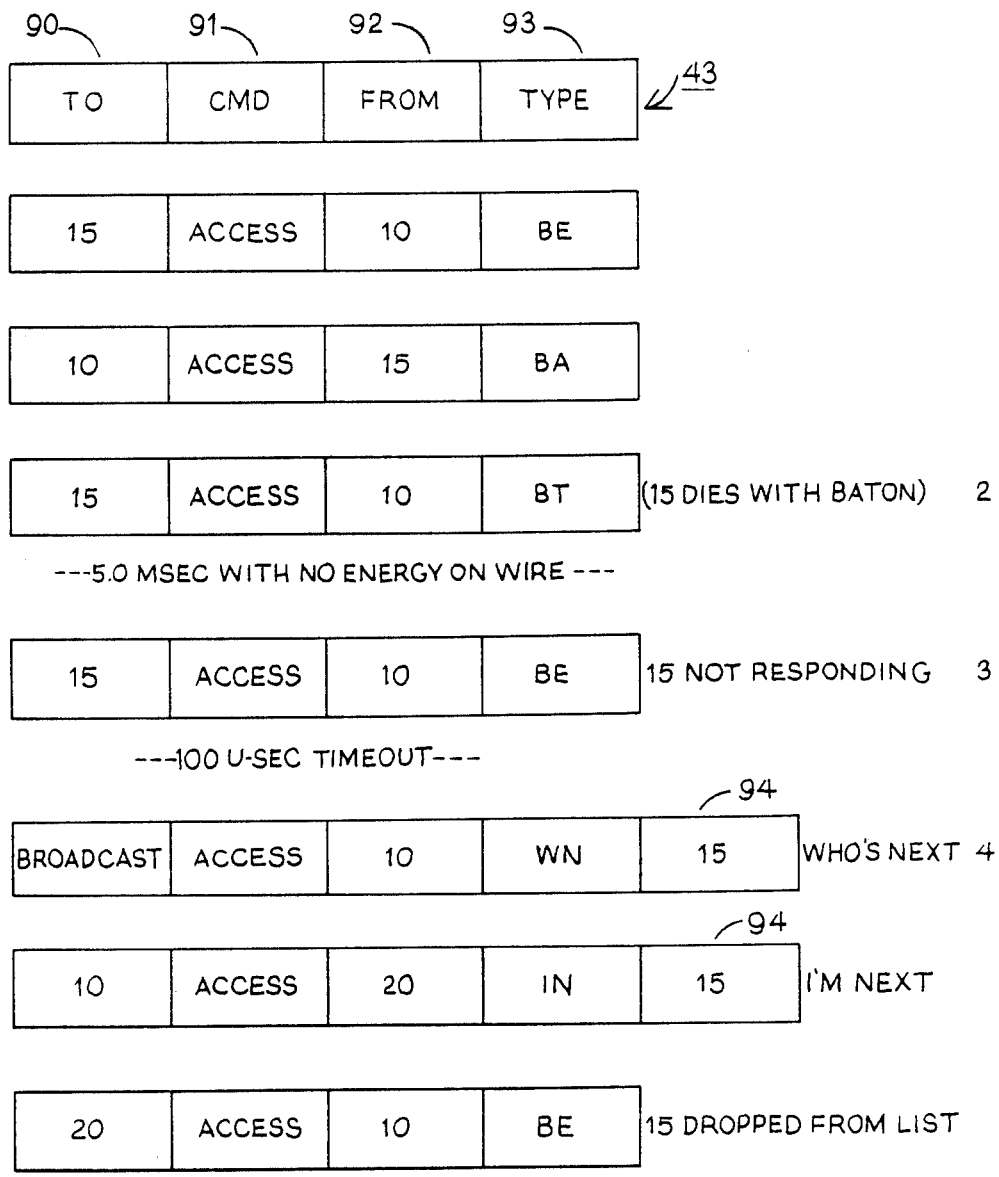
FIG. 14 is a diagrammatic representation of typical messages sent in a token pickup access message sequence in which your TO station does not go on the bus.

Table 6 in combination with FIG. 14 details the Token Pickup message sequence. Thus as shown in Table 6, four steps relate to the Token Pickup message sequence. The first step is where after passing the token, the station watches the bus to see that the new owner uses it. If the new owner has not seen the token after the token pass signal is generated (due to noise on the bus) it would not use the token. This would be perceived by the previous token owner as the present token owner dying with the token. The present token owner may alternatively actually die with the token; that is, after receiving it the station malfunctions preventing it from transmitting HDLC messages or passing the token to its TO station. After a timeout which is typically 5 milliseconds without the previous token owner seeing energy on the bus, (which would represent the new token owner not using the token) the previous token owner will retry to pass the token, and if unsuccessful, will determine an unsuccessful token pass attempt and initiate the WHO'S NEXT message sequence.

TABLE 6

Token Pickup (Your TO dies)

1. After passing the token, the station watches the bus to see that the new owner uses it.

2. The new owner might not have seen the token, or may immediately die.
3. If 5.0 milliseconds lapse without energy on the bus, the token pass sequence is retried by the previous owner.
4. If its next has died, then the sequence will become a "who's next" message sequence.

FIG. 14 thus shows that station 10 passes the token to station 15. However, station 15 dies with the token after a 5 millisecond timeout without seeing energy on the bus (or wire). Station 10 then sends a token enable signal back to station 15 and if after a 100 microsecond timeout a token acknowledge is not received from station 15 will retry to send the token by reinitiating the token enable signal to station 15 for a total of three times. After that, station 10 enters the WHO'S NEXT state and proceeds in a manner described above and shown in FIG. 13. Thus a WHO'S NEXT broadcast signal is transmitted by station 10 and if station 20 was the station next to receive the token after station 15, station 20 would send an I'M NEXT signal (IN). Station 10 would then proceed to initiate a token pass handshake with station 20 by sending a token enable signal to station 20.

Another common message sequence is known as Token Pickup in which a present token owner's FROM dies with the token. Thus referring to FIG. 1 if station A is the token owner when it receives the token from station L, station B, the next station to receive the token, records station A receiving the token by going from the IN LIST state to the WATCHING FROM state due to its observence of the token sent to its FROM, event 62 (FIG. 17D). If its FROM station (station A) does not use the token within a period of time equal to one-third T by generating either a HDLC message or by attempting a token pass to station B, station B will perceive a timeout, and will thus enter the TOKEN PASSING state. Station B will then attempt to pass the token to its next (TO) station, which would be station C.

It should be noted that station B does not enter the HDLC MASTER state, but merely is a conduit for passing the token from itself to the next station to keep the token moving. The token will return to station B on the next pass at which time it will enter the HDLC MASTER state due to the fact that by that time station A will be patched out of the token list. That is on the next go-around presuming that station A is still faulty, station L will not be able to pass the token to station A and will then enter a WHO'S NEXT message sequence at which time station B will indicate that it is next and station L will pass the token to station B, patching out station A.

Figure 15:
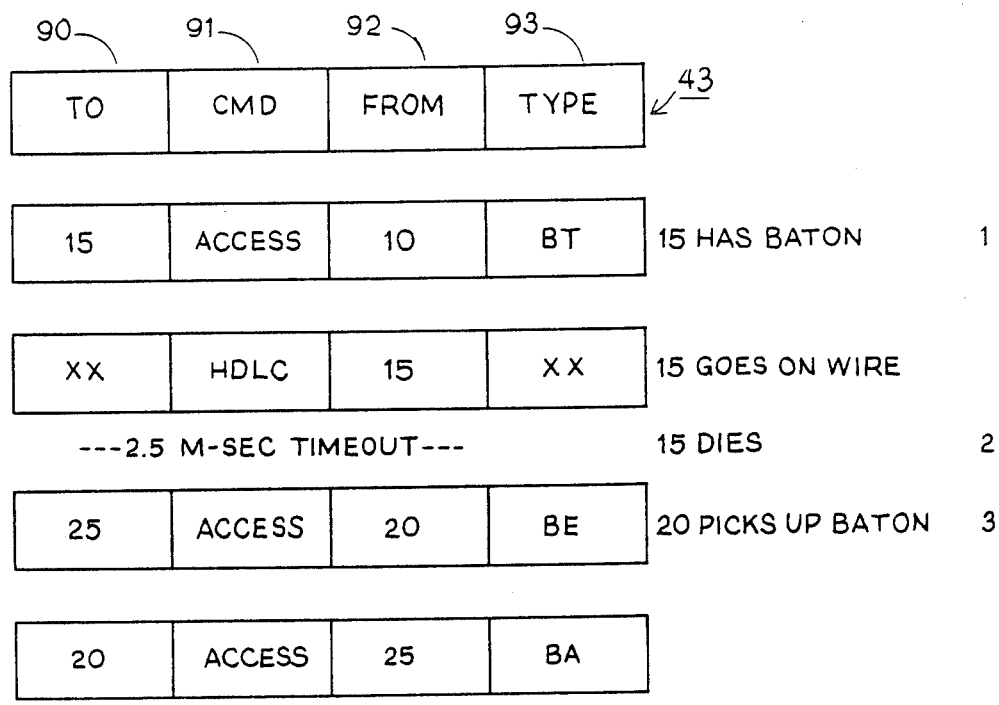
FIG. 15 is a diagrammatic representation of typical messages sent in a token pickup access message sequence in which the FROM station dies with the token.

Table 7 in combination with FIG. 15 gives the details of the steps comprising the token pickup message sequence for the situation where a station's FROM station dies with the token. Thus, it is seen from Table 7 that the first step performed is that a station realizes that its FROM station has received the token. The second step is that the station realizing its FROM has received the token also realizes that a one-third T timeout has occurred without energy being transmitted onto the bus by the token owner. This time is typically 2.5 milliseconds. The next step is for the unit that next receives the token to pick up the token and pass it to its TO station (that is for example where station B picks up the token and passes it to station C).

FIG. 15 illustrates this in terms of the messages sent onto the bus. Thus station 10 first sends the token to station 15 by a token pass (BT) signal. Station 15 is on the bus and would normally transmit high level HDLC messages but for some reason does not do so. This is seen as a lack of energy on the bus by station 20, the station to next receive the token from station 15. Station 20 then takes the token and sends a token enable signal to its TO station which happens to be station 25. Station 25 acknowledges this token enable signal by generating a token acknowledge signal. The handshaking protocol would continue and the token would pass to station 25.

TABLE 7

Token Pickup (your FROM dies with the token)

1. When the token is passed to a units FROM, this is recorded.
2. If the bus subsequently goes dead for 2.5 milliseconds, a token pickup is initiated.
3. This unit (the FROM'S TO station) will then pickup the token.

All of the above message sequences have assumed that there has been a token list generated and in operation. However, it is obvious that upon power up no such token list would exist. Furthermore, there can be multiple errors such that the token is not passed from one station to another. Such a situation could be where the present token owner dies with the token and for some reason the station to which it would next pass the token (the station in the WATCHING FROM state, see FIG. 17D) does not respond to the one-third T timeout and thus does not enter the token passing state). Similarly the station which sent the token to the present token owner may for some reason not perceive that the present token owner is failing to utilize the token (that is it perceives the two-thirds T event). In addition, the present station may truly be defective and not pickup the token after three-thirds T timeout has occurred. In this case, a four-third T timeout will occur for properly operating stations. This timeout is called the BUS IS DEAD timeout, event 64, which will cause the IN LIST and OUT OF LIST state stations to enter the BUS IS DEAD state (see FIGS. 17C and 17D).

A BUS IS DEAD state can also occur when an illegal message, event 59, is seen by the token owner. Such an illegal message would typically occur where a broken bus, as shown in FIG. 3, is repaired, as shown in FIG. 2. Then two token owners would initially exist, creating illegal messages to appear on the bus. The token owners would then each enter the WAIT state, and if a message, event 61, is not seen within a period of time (such as four-thirds T), it will enter the BUS IS DEAD state.

As best seen in FIGS. 17A-D, when the BUS IS DEAD is perceived by a station, it performs a Bus Rebuild Timeout, event 68, which, in the preferred embodiment, is a timeout whose length is a function of the address of that particular station. Thus, if more than one station is in the BUS IS DEAD state, each will perform its respective Bus Rebuild Timeout, but only the first one which times out enters the PASSING INITIALIZATION or SEARCH state. It should be noted that other techniques, such as generating a random number timeout, for determining the station to start the initialization search could be utilized, especially when thousands of stations are part of the communication system.

The first station in the SEARCH state then does a linear search starting with its address plus one to search for the next highest address station on the bus.

Figure 9:
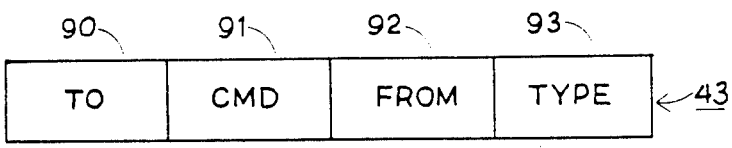
FIG. 9 is a diagrammatic representation of typical messages which would be sent in an initialization access message sequence.
Figure 9:
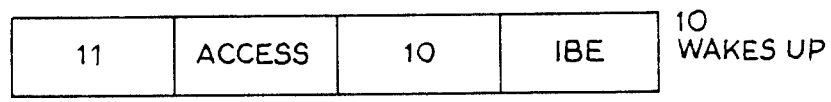
Figure 9:
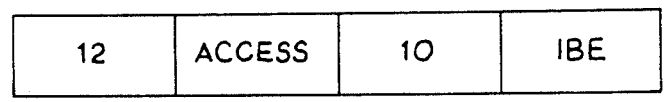
Figure 9:
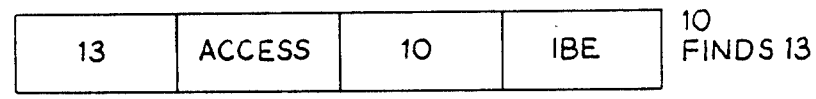
Figure 9:
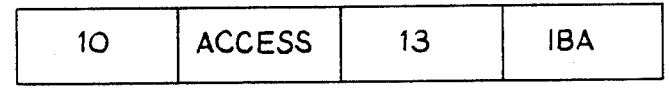
Figure 9:
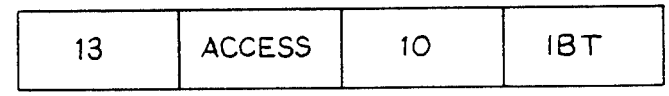
Figure 9:
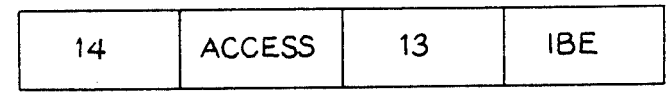
Figure 9:
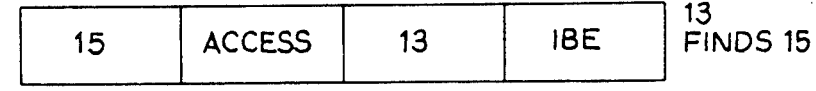
Figure 9:
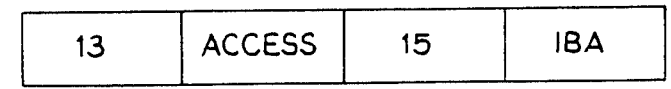

A detail of the initialization sequence is given in Table 8 in conjunction with FIG. 9. As noted in step 1 of Table 8, the initialization sequence Rebuild Timeout, event 68, is preferably chosen to equal the address of the station times 100 microseconds. The first station entering the SEARCH state sends out token initialization signals to sequentially higher addresses. Upon locating another station, it passes an initialization token, event 76, and this new station enters the SEARCH state to search for a third station. The successful initialization token pass, event 70, causes the first station to enter the IN LIST state.

The search continues, looping around all 255 stations as described in the preferred embodiment, until the originator of the search is found. In order to denote the originator of the search, a special bit is stored by that station which is known as the SEARCH STOP bit.

TABLE 8

Initialization Sequence

1. The initialization sequence is entered whenever the bus is dead for 10 milliseconds (4/3 T, where T=7.5 milliseconds). This can result from breakdown of access sequence (multiple failures) or mass power up. Each station sets a timeout to their address times 100 microseconds. The first one timing out begins the Initialization sequence. It sends IBE's to sequential higher address until it locates another access station.
2. Upon locating another it passes the initialization token, and the second station searches for the third. The search continues, looping around to 1 after 255, until the originator is found. This station starts the normal token pass. Note—the originator of the initialization sets a search stop bit in its access module in order to stop the initialization sequence.

This bit is set by the station first entering the passing initialization state, and thus when the initialization search loops back to this station, it knows that the initialization sequence has been completed, and that normal token passing can begin. This SEARCH stop bit is stored in the access module 24 along with the FROM and TO station addresses.

In FIG. 9, an example is described where station 10 is the first station to TIMEOUT through event 68. Station 10 then accesses station 11. After a 100 microsecond timeout of not receiving a token acknowledge signal from station 11, station 10 accesses station 12 and will continue to do so until it finds a station which generates a token acknowledge signal within the 100 microsecond time period. In the example shown in FIG. 9, station 13 sends such a signal to station 10. Station 10 then sends an initialization token to station 13 (the IBT signal). Station 13 then resumes the search, sending out initialization token signals to its sequentially higher address stations until receiving an initialization token acknowledgement signal, which in this example occurs from station 15.

The overall search continues until it loops back to station 10 at which time the initialization sequence is completed and normal token passing begins. In FIG. 17C, a successful initialization pass event 70 is perceived as changing the state of that station from the passing initialization state to the IN list state. Thus, in the example shown in FIG. 9, after station 10 successfully passes the token to station 13, station 10 enters the IN LIST state; that is, it is one of the stations which is going to be part of the token list. Such a state is then obtained for station 13 when station 15 is found. This continues for all the stations which send an initialization token acknowledge signal to the station performing the initialization search.

Figure 16:
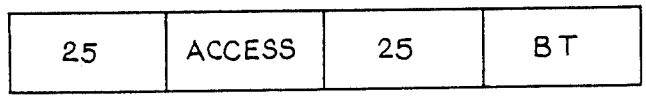
FIG. 16 is a diagrammatic representation of an only-one access message sequence.

If, however, the initialization search is unsuccessful, resulting in event 71, the station which encounters this event will enter the ONLY ONE state. Here the station will perform an Only One Timeout, event 72, followed by a token pass to itself (state PASS TO SELF). FIG. 16 shows the message format for such a token pass.

The Only One Timeout is equal to a relatively large multiple of the DEAD BUS TIMEOUT and is typically 160 milliseconds for a BUS DEAD TIMEOUT of 10 milliseconds. Regardless of the multiple chosen, this timeout is relatively long with respect to the DEAD BUS TIMEOUT. The reason is to prevent a station in the ONLY ONE state from interferring with other stations on the bus in a situation where the station in the ONLY ONE state is there not because it is truly the only one attempting to communicate on the bus, but because it perceives itself as the only one while in actuality it is not. This latter situation can occur where the station in the ONLY ONE state has a bad receiver and thus cannot hear other stations on the bus, and consequently believes itself to be the only one. In such a situation, if the station in the ONLY ONE state were able to frequently pass tokens on the bus to itself, this could substantially interfer with the other stations on the bus. Thus, the Only One Timeout restricts the frequency of such token passes.

It should be noted, however, that after receiving an unsuccessful search, event 71, a station could truly be in the ONLY ONE state wherein no other station is active on the bus. If, however, another station in essence wakes up and becomes active on the bus, some message would be received by the station in the ONLY ONE state, this corresponding to event 74. This would cause the station in the ONLY ONE state to enter the WAIT state and to then enter the OUT OF LIST state upon seeing another message, event 63.

It should be noted that whenever a search is started by a state having its Bus Rebuild Timeout occur, its sending out an initialization Token Enable signal to a station in the ONLY ONE state, causing that station to enter the SEARCH state to continue the initialization sequence.

Thus, the initialization message sequence is critical to building the token list after an initial POWER UP and also to rebuild the list when multiple errors occur, causing the stations on the bus to enter the BUS IS DEAD state. If the station entering the ONLY ONE state, due to an unsuccessful initialization search event 71, is truly the ONLY ONE station, then it will remain in this state until either some other station starts to communicate on the bus through an initialization search and finds this station in the ONLY ONE state or alternatively when the station in the ONLY ONE state generates a token pass to itself which is heard by other stations on the bus indicating that some other station (namely the one in the ONLY ONE state) is alive on the bus.

However, as mentioned above there is the possibility that a station has entered the ONLY ONE state due to a faulty receiver or some other problem with that station in which it cannot hear anyone else and therefore perceives itself to be the only station on the bus. In this situation, this station should not proceed with an initialization procedure since that would interrupt the other stations on the bus which have formed a token list and are passing the token between themselves. Consequently, the ONLY ONE TIMEOUT is a large number with respect to the BUS IS DEAD TIMEOUT, and therefore the station in the ONLY ONE state is only allowed to pass the token to itself, giving evidence of itself to other stations, only after a relatively long time period. Thus, its interference with the operation of the communication system is minimized. Passing the token to itself, however, indicates to the stations on the bus and in particular, to a monitor 29 (see FIGS. 2 and 5) connected to the bus, that a station is on the bus which is operating improperly. The monitor can therefaore locate the faulty station(s) so that their mainentance can be instigated. The monitor can also be used for other purposes, such as determining how many stations on the bus are in the token list and for what percentage of time HDLC messages are being transmitted.

Tables 9-13 detail the state variable definitions, the byte variable definitions, the time usages, as well as the responses to noise, illogical messages, and interrupt usages respectively. These tables give further details for implementing the access mechanism of a local area network communication system according to the present invention.

Finally, the hardware for forming the access module is preferably the Intel Corporation 8051 microprocessor. Since the bus uses a serial data transmission while the microprocessor uses parallel data, a Motorola 68B54 serial/parallel conversion can be used. The data communication module 25 can use the Intel Corporation 8088 microprocessor chip. Furthermore, each station has at least one timer 65 (part of the 8051) (see FIGS. 2 and 5) for generating the time periods sensed by the respective stations as the various perceived events described above.

Thus, in summary, what has been described is a communications system utilizing a token for access to the data communications medium in which the token is passed between stations in a token list. Techniques for allowing stations to become part of the token list as well as their removal, depending upon perceived events, have been described. Furthermore, the ability to change the handshaking protocol during token passing has been described. The initialization procedure for forming an initial token list, as well as for making a token list when multiple errors have occured, has also been described.

TABLE 9

STATE VARIABLE DEFINITIONS
Note: Baton is Synonymous With Token

| Boolean | | |
|---|---|---|
| KT-HIT | True: | Bus dead 5 ms interrupt has executed. At the next 5 ms timeout the bus will be declared dead. |
| | Set: | Timer interrupt |
| | Clear: | any carrier up interrupt |
| Only-One | True: | Unit has executed initialization bus search and found none. |
| | Set: | Following unsuccessful initialization search. |
| | Clear: | Receive any good CRC message. |
| New-One | True: | Unit has just powered up. |
| | Set: | Power on initialization. |
| | Clear: | Receipt of good CRC message Begin initialization search |
| First Bus Search | True: | This unit began an initialization sequence. |

TABLE 9-continued

STATE VARIABLE DEFINITIONS
Note: Baton is Synonymous With Token

| Boolean | | |
|---|---|---|
| | Set: | When beginning initialization search. |
| | Clear: | Receive message to ME See non-initialization message on wire |
| Mid Bus Search | True: | This unit received and passed on an initialization baton. |
| | Set: | When receives initialization baton. |
| | Clear: | Receive message to ME See non-initialization message on wire. |
| In-List | True: | This unit is in the baton pass list due to successful initialization or demand. |
| | Set: | Receive initialization baton. Receive demand baton. |
| | Clear: | Bus dead timeout Baton skips our address |
| BT-Only-On | True: | This unit has shifted to Baton only, skipping enable and acknowledge. |
| | Set: | Following 16th sequential error free baton pass |
| | Clear: | Baton pass timeout/retry Who's next Bus dead, initialization sequence. Receive a "Load Your To". |
| WNBP | True | Performing a baton pass following a Who's next sequence. |
| | Set: | Begin sequence |
| | Clear: | Exit sequence. |
| From Has Baton | True: | Saw baton pass to my from. |
| | Set: | See BT addressed to My From |
| | Clear: | Receive baton Pickup baton See an Access |
| Demanding | True | Have sent demand. |
| | Set: | When sending demand |
| | Clear: | get demand baton see non-demand sequence message |
| Baton Req. | True | This unit wants to be in baton pass sequence. |
| | Set: | Initialization Alarm (part time owner) |
| | Clear: | Higher level of software notification. |
| Did Demand | True: | Got Baton through demand baton sequence. Need to send "Load Your To". |
| | Set: | Get demand baton |
| | Clear: | Pass demand baton Send LYT |
| HDLC Req | True: | Have master message to send at next ownership. |
| | Set: | Higher level notification |
| | Clear: | Same |

TABLE 10

| BYTE VARIABLES | |
|---|---|
| My To | Recorded follower in access sequence. |
| | Set: Pass initialization baton to this unit. Receive "Load Your To" Successful "Who's Next" pass Receive Demand Baton from this unit |
| | Clear: Bus declared dead Unsuccessful "Who's Next" |
| My From | Recorded predecessor in access sequence. |
| | Set: Receive initialization baton from this unit. Pass demand baton to this unit. Receive Baton following "Who's Next". Send a "Load Your TO" |
| | Clear: Bus declared Dead |
| Me | This units address. |

TABLE 10-continued

| BYTE VARIABLES | | |
|---|---|---|
| | Set: | Obtained at power-up |
| BPRC | Baton pass retry count. | |
| | Increment: | Transmission of Baton message |
| | Clear: | Entrance of pass routine |
| BPPUC | Baton pass pick-up count | |
| | Inc.: | Transmit operate |
| | Clear: | From seen as active |
| BT-Success | Number of error free long baton passes | |
| | Inc.: | Send baton operate |
| | Clear: | Baton pass timeout |
| | | Pickup (from not active) |
| | | CRC error on Baton Acknowledge |

TABLE 11

TIMER USAGE

The state map utilizes numerous timeouts, however, no more than two simultaneously. This explanation is in terms of burdened states and their timeouts. The specific values given are exemplary, but may be varied.

Note: Baton is synonymous with token. Owner is synonymous with station owning or possessing the baton. Burdened state are those states associated with the token owner, its FROM and its TO.

1. Baton Owner
   A baton owner can keep the baton up to a maximum period prior to passing to another owner. This limit is settable up to 110 ms. Additionally, the baton owner must ensure the gap between messages on wire does not exceed 2.5 milliseconds. ($\frac{1}{3}$T).
2. Baton Owner Passing Baton (including demand, initialization)
   The timeout (carrier drop to carrier up) is preferably 100 microseconds in this sequence.
3. New Baton Owner Awaiting Demands
   Following baton message the new owner watches the bus for 50 microseconds to allow demanders to signal him. Any carrier up seen for a 40–100 microseconds is interpreted as a demand even if a valid message is not received.
4. Baton Passer Watching for Energy
   After sending the baton message, the unit watches for carrier up and if not seen in 5.0 milliseconds the baton pass is retried. ($\frac{2}{3}$T)
5. Bus Resident, TO has baton
6. Bus Resident
   If the unit fails to see a carrier detect for 10 milliseconds, it declares the bus dead and enters the initialization sequence. (4/3 T, T=7.5 milliseconds).
7. Unit Receiving Message
   The maximum message is as carrier up of 1 millisecond. If carrier up persists longer than this it is ignored and the unit proceeds with sequence.
8. Only One
   Following a failed initialization search the unit sends a message every 160 milliseconds. This message is a baton pass to itself, allowing any other masters just coming on to demand.

TABLE 12

Algorithm Responses to Noise

Carrier detect is used to signal a message arriving. This table covers responses to carrier detected but invalid message (or none) received. It is organized by burdened states.

1. Baton Owner
   The baton owning station checks carrier detect prior to transmitting and if high this will delay transmission. If carrier remains high 1 millisecond the baton owner transmits anyway.
2. Baton Owner as HDLC Master
   While awaiting response any badly received messages (including carrier without flag, aborted frames, frames with bad CRC check sequence) are ignored. The unit timing the response causes process continuation, lack of a correct response within the timeout period leads to a retry.
   If carrier comes up during the timeout period and remains up at timeout (out of frame) the Baton owner delays retry 1 millisecond (maximum) while waiting for carrier to drop.
3. Baton Owner Passing Baton
   This unit must watch to verify the next owner uses the baton. If carrier goes high during the 50 u-second demand window this will not effect this determination. However a carrier rise after the demand window maintained at least 20 microseconds, qualifies, even if a valid frame is not detected.
4. New Baton Owner Awaiting Demands
   During the 50 microsecond demand window a carrier rise that persists 40 microseconds is interpreted as multiple (colliding) demanders even though a valid frame is not detected.
5. Bus Resident ("TO has baton")
   As described in Timer Usage, any carrier-up interrupt resets the bus dead time. Otherwise any invalid frames received is ignored.
6. Only-One
   Invalid frames are ignored. The first valid frame received clears the only-one state.

TABLE 13

Algorithm Responses to Illogical Messages

This table covers the response to unexpected, good CRC access messages.

1. Baton Owner
   If the unit receives an unexpected message (enables, batons, etc.) it drops the baton and goes idle. Unexpected slave messages (such as baton acknowledge) from wrong unit results in sequence being restarted.
2. Bus Resident
   If the unit receives an incorrect or illogical access message it returns an access reject message type.

It will be appreciated that although the specific embodiment shown in FIGS. 17A–17D results in a communication system embodying the underlying principals of the present invention—including the concept of the station presently having the token knowing from whom it receives the token as well as to whom it will next pass the token—it is readily apparent that other formulations of the fundamental rules of passing the token can be structured so as to give rise to different ways for the same states shown in FIGS. 17A–17D to occur depending upon perceived events or for some different states to occur. The underlying concept of each station embodying the same sets of rules for recognizing particular events (except for slave stations 22') and what to do upon perception of those events is key to the present invention so that each station has potential token access capability.

Figure 4:
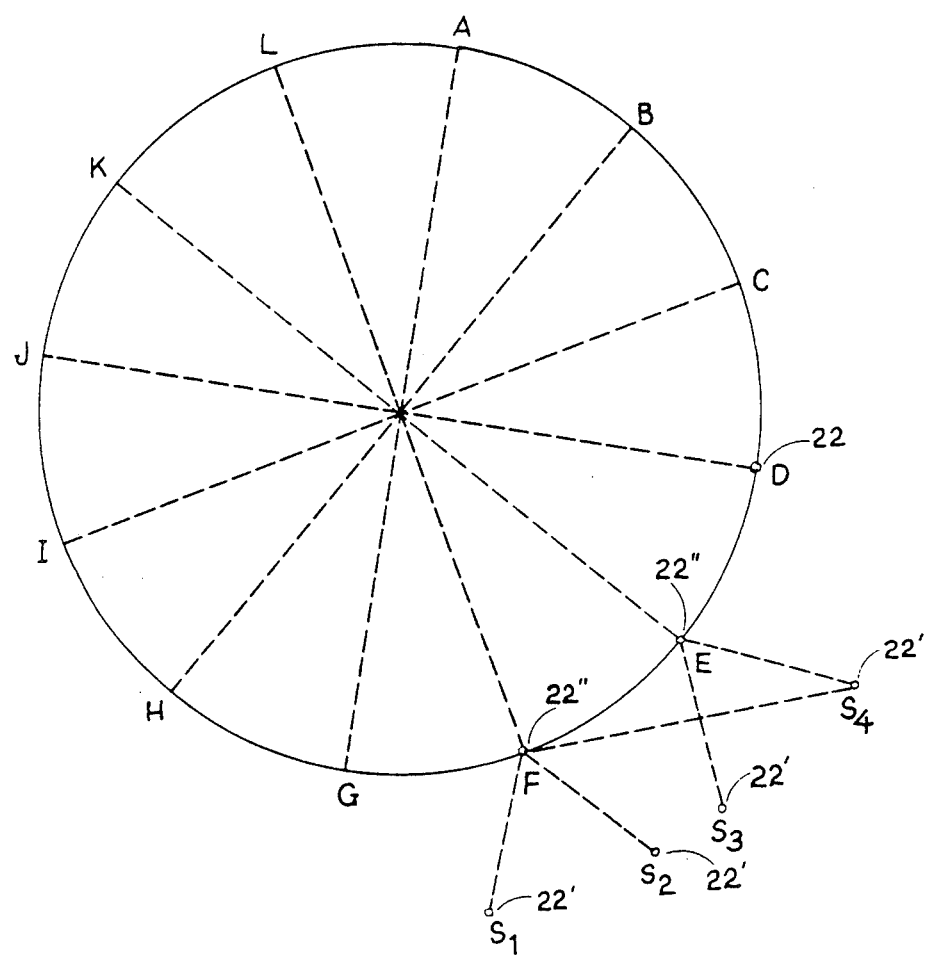
FIG. 4 is a diagrammatic representation of a group of stations linked together in a loop of control (a token list) wherein the token is passed from one station to another, and further comprising the ability for one or more stations to be master stations with respect to subservient slave stations which, although connected to the bus, never have the possibility of access to the token for control of the bus.

It has also been shown that some stations (22', FIGS. 4 and 5) can be interconnected to the bus which do not have token access capability and are always under the control of one or more master stations having token access capability. This provides for the ability to interconnect to the bus stations having relatively unsophisticated access mechanisms, yet in a way which will not deteriorate the communication on the bus for stations having token access capability. Consequently, utilizing the underlying rules and the perceived events to give rise to state changes, it is apparent that various communications systems using the token pass concept can result.

It will thus be seen that the objects set forth above, and those made apparent from the preceding description, are efficiently attained, and, since certain changes may be made in carrying out the above method of communication as well as in the construction of the communication system without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described, and all statements of the scope of the invention which, as a matter of language, might be said to fall therebetween.

Having described the invention, what is claimed is:

1. A method of communicating over a communication medium by a plurality of stations interconnected to the medium, comprising the steps of:
   (1) generating a list of all stations wanting periodic access to the medium (token list);
   (2) each station in the token list capable of sending access type messages for receiving and transferring access to the medium between itself and other stations interconnected to the medium and non-access type messages for transferring all other types of information to stations interconnected to the medium;
   (3) each station in the token list knowing from which station (its "FROM" station) it is to receive access transfer enable information and access control information (token) to allow it to obtain access to the medium, as well as to which station (its "TO" station) it is to next pass access transfer enable information and access control information after it has received access to the medium;
   (4) each station in the token list, within a first predetermined length of time after it has received access to the medium transmitting non-access messages on the medium or passing access transfer enable information to its TO station, and within a maximum non-access message predetermined length of time after it has received access to the medium, passing access transfer enable information to its TO station;
   (5) the TO station, within a second predetermined length of time, acknowledging receipt of the access transfer enable information to the station from which it received the access transfer enable information;
   (6) the station passing the access transfer enable information listening to the medium to ascertain if its TO station has sent acknowledge receipt information of the access transfer enable information within the second predetermined length of time, and if acknowledge receipt information has been received, sending access control information to its TO station; and if the station passing access transfer enable information does not receive from its TO station such acknowledge receipt information within the second predetermined length of time, it resends N number of times (where N is an integer equal to or greater than 0) access transfer enable information to its TO station; and
   (7) if the station passing access transfer enable informationm has not received acknowledge receipt information from its TO station after resending access transfer enable information N times, it then sends a broadcast message to all stations interconnected to the medium requesting identification of the station which is the present station's TO station's TO station, and upon ascertaining its TO station's TO station sending access transfer enable information to that new TO station.

2. A method of communicating over a communication medium as defined in claim 1 further comprising the step of patching out a station from the token list which does not acknowledge receipt of access transfer enable information.

3. A method of communication as defined in claim 2 wherein each station in the list listens to the medium to ascertain when its FROM station has access to the medium so that when this condition occurs and if it determines that its FROM station does not transmit on the medium within the first predetermined length of time, initiating and obtaining its own access to the medium and patching out its FROM station from the token list.

4. A method of communication as defined in claim 1 wherein each station in the list listens to the medium to ascertain when its FROM station has access to the medium so that when this condition occurs and if it determines that its FROM station does not transmit on the medium within the first predetermined length of time, initiating and obtaining its own access to the medium.

5. A method of communicating over a communication medium as defined in claim 4, further comprising the step of each station in the list ascertaining the number of times that it has passed the token to its TO station in an error-free manner and if the number of such passes exceeds a predetermined number, eliminating the token enable information and token acknowledge information for the transfer of the token for that station and only transferring the token to its TO station.

6. A method of communicating over a communication medium as defined in claim 1, wherein the station that passes the token listens to the medium and ascertains if its TO station is transmitting on the medium within a third predetermined length of time, and if its TO station is not so using the medium as perceived by the station that passed the token, then that station reattempts M number of times (where M is an integer equal to or greater than 0) to pass access transfer enable information to its TO station; and further wherein if the TO station does not acknowledge receipt of this access transfer enable information within the second predetermined length of time or does not transmit on the medium within the third predetermined length of time, sending a broadcast message to all stations asking for identification of the station which is the present station's TO station's TO station and upon ascertaining its TO station's TO station, passing access transfer enable information and access control information to that station in a manner as set forth in steps 3-6 of claim 5.

7. A method of communicating over a medium as defined in claim 6 further comprising the step of patching out a station from the token list which has been skipped over by its FROM station.

8. A method of communicating over a communication medium as defined in claim 1 wherein the step of generating a list of stations wanting periodic access to the medium comprises the following substeps:
   (a) each station upon power up, if a token list does not presently exist, entering a state (BUS IS DEAD) for initial generation of the token list;
   (b) each station which has entered the BUS IS DEAD state waiting an amount of time proportional to a unique characteristic of the station (BUS REBUILD TIMEOUT 68), which, for the first station to so timeout, enters a search state (PASSING INITIALIZATION TOKEN state) for determining the next station to enter the search state and if such a station is found, for itself to enter the token list state (IN LIST state) as the first station in that list;
   (c) each station enters the PASSING INITIALIZATION TOKEN state in turn entering the token list after determining the next station to enter the PASSING INITIALIZATION TOKEN state; and
   (d) continuing step (c) until the next station that enters the PASSING INITIALIZATION TOKEN state is the first station that entered the token list, at which time the initial token list is completed.

9. A method of communicating over a communication medium as defined in claim 8 wherein each station has an address and wherein the unique characteristic of each station for determining its bus rebuild timeout period is the address of the station.

10. A method of communicating over a communication medium as defined in claim 9 wherein
   (a) each station on the medium which is active enters a BUS IS DEAD state upon not seeing intelligible information on the medium for a fourth predetermined length of time; each station which enters the BUS IS DEAD state waiting an amount of time proportional to its address, with the first station to have its time period expire (BUS REBUILD TIMEOUT event 68) entering the PASSING INITIALIZATION TOKEN state for determining the next station to enter this state and if such a station is found, for itself to enter a token list (IN LIST state) as the first station in the list;
   (b) each station that enters the (PASSING INITIALIZATION TOKEN state) in turn entering the token list after determining the next station to enter the PASSING INITIALIZATION TOKEN state; and
   (c) continuing substep (b) until the first station to enter the token list is the next station that would enter the PASSING INITIALIZATION TOKEN state, at which time a token list is completed.

11. A method of communicating over a communication medium as defined in claim 10 further wherein some of the stations that interface with the medium cannot enter the token list and wherein all communications by these stations are in response to messages received from stations which have access to the medium.

12. A method of communicating over a communication medium as defined in claim 10 wherein each station in the PASSING INITIALIZATION TOKEN state, if unsuccessful in its search for the next station to receive the initialization token, enters an ONLY ONE state where it remains until any type message activity is seen on the medium or the station receives the initialization token.

13. A method of communicating over a communication medium as defined in claim 12 further wherein a station in the ONLY ONE state if it receives an initialization token from another station which is conducting an initialization search, becomes the station which continues the initialization search and thus is no longer in the ONLY ONE state.

14. A method of communicating over a communication medium as defined in claim 13 wherein a station in the ONLY ONE state enters an OUT OF LIST state if it receives a message from the medium.

15. A method of communicating over a communication medium as defined in claim 12 wherein a station in the ONLY ONE state enters an OUT OF LIST state if it receives a message from the medium.

16. A method of communicating over a communication medium as defined in claim 1 wherein the TO station after receipt of access control information provides a demand window for a fifth predetermined length of time so as to allow stations (demanders) having addresses between the present token owner's address and its FROM station's address to request entry into the token list, and if such a request is received during the demand window time period, passing the token to the demanding station.

17. A method of communicating over a communication medium as defined in claim 16 wherein the station which demands access to the medium informs the FROM station of the station that passed the token, to change the address of its TO station with its (the demander's) address; whereby the demanding station is patched into the token list and need not demand the token any longer.

18. A method of communicating over a communications medium as defined in claim 17 wherein the station which demands the token, upon receipt of the token initiates a demand window whereby any station having an address between the previous FROM station and the present demand station can demand access to the medium, and if such a demand station is perceived, the station is patched into the token list.

19. A method of communicating over a communications medium as defined in claim 18, wherein each station has an address and it two or more stations demand access to the medium during the same demand window, the present token owner station searches backward for the highest addressed demanding station and passes the token to that station and wherein that station in turn has a demand window which if it perceives multiple demanders, passes the token backward to the highest addressed demander, and wherein this process is continued until the lowest addressed demander is located, which demander then patches itself into the token list by requesting that the first station's FROM station change the address of its TO station to the present token owner station.

20. A method of communicating over a communications medium as defined in claim 1 wherein each station in the token list if it does not perceive either passing of the token from one station to another or non-access messages on the medium within a sixth predetermined length of time, enters the BUS IS DEAD state.

21. A method of communicating over a communication medium as defined in claim 1 further wherein some of the stations that interface with the medium cannot enter the token list and wherein all communications by these stations are in response to messages received from stations which have access to the medium.

22. A method of communicating over a communication medium as defined in claim 1 wherein the step of ascertaining a station's TO station's TO station encompasses the step of the TO station's TO station listening to the medium for a message that identifies its FROM station as another station's TO station which is not operating properly and for which the identity of its TO station is required, and wherein the TO station's TO station in response sends a message to its FROM station's FROM station identifying itself as the TO station's TO station.

23. A method of communicating over a communication medium as defined in claim 22 wherein the station seeking its TO station's TO station sends a broadcast message containing a WHO's NEXT command and wherein the TO station's TO station, upon receiving such a WHO'S NEXT command, sends an I'M NEXT command to its FROM station's FROM station so as to identify itself to that station.

24. A method of initializing a first group of stations (token list) forming a perfect intersection or a subset of a second group of stations interfaced with a communication medium, the first group of stations to share periodic access to the communication medium, comprising the steps of:
 (1) each station upon power up entering a state (NEW ONE) which upon expiration of a timeout (NEW ONE TIMEOUT 66) enters a state (BUS IS DEAD) for initial generation of a list (token list) of all stations which want to have periodic access to the medium (token ownership);
 (2) each station which has entered the BUS IS DEAD state waiting an amount of time proportional to a unique characteristic of the station (BUS REBUILD TIMEOUT 68), which, for the first station to timeout, enters a search state (PASSING INITIALIZATION TOKEN) for determining the next station to enter the search state, and if such a station is found, for itself to enter the token list state (IN LIST) as the first station; and
 (3) each station that enters the PASSING INITIALIZATION TOKEN state in turn entering the token list after determining the next station to enter the PASSING INITIALIZATION TOKEN state; and
 (4) continuing step 3 until the next station to enter the PASSING INITIALIZATION TOKEN state, is the first station that entered the token list, at which time the initial token list is completed;
whereby an initialization of stations to have periodic access to the medium is obtained.

25. A method as defined in claim 24 wherein each station to enter the token list knows the station (FROM station) it is to receive the token as well as to which station (TO station) it is to pass the token.

26. A method as defined in claim 25 wherein each station has an address and wherein the unique characteristic of each station for determining its bus rebuild timeout period is the address of the station.

27. A method as defined in claim 26 wherein each station when in the PASSING INITIALIZATION TOKEN state, attempts to pass access transfer information to the next higher addressed station and if successful (SUCCESSFUL INITIALIZATION PASS event 70) it enters the IN LIST state and if unsuccessful (UNSUCCESSFUL SEARCH event 71) the station enters a state wherein it perceives itself as the only station having access to the medium (ONLY ONE state); wherein each station when in the ONLY ONE state initializes a timer which upon expiration (ONLY ONE TIMEOUT event 72) enters back to the ONLY ONE state while making evident to the medium that it is passing the access transfer information to itself so as to give notice to other stations that this station is active; and repeating the ONLY ONE TIMEOUT event until the station receives an initialization token from a station in the PASSING INITIALIZATION TOKEN state or receives a message (MESSAGE RECEIVED event 74) at which time it ultimately enters a state (OUT OF LIST) from which it can enter the token list.

28. A method as defined in claim 27 wherein a station entering the OUT OF LIST state enters the token list by perceiving the passing of the token from a station having a lower address than itself to a station having a higher address than itself and when this is perceived entering a state (DEMANDING) so as to demand from the station receiving the token that it is to receive the token instead.

29. A method as defined in claim 28 wherein each station which receives the token after initialization of the token list is completed, has a demand window time period within which stations having addresses greater than the station from which it has received the token or having addresses less than said passing station if said station has the highest address of all stations in the token list may demand the token and if such a demand is received, passing the token to the demanding station.

30. A method as defined in claim 29 wherein the station receiving the demand token informs the station (the FROM station) which originally sent the token to the station (the TO station) from which it received the demand token that it, the demanding station, is the new station (new TO station) to receive the token from this lower addressed station (FROM station) rather than the station (former TO station) which formerly received the token.

31. A method as defined in claim 30 wherein the station which demands the token, upon receipt of the token, initiates a demand window so that any station having an address between the present station and the FROM station can demand access to the medium and if such a demand station is perceived, that station is patched into the token list.

32. A method as defined in claim 31, wherein each station has an address and if two or more stations demand access to the medium during the same demand window, the present token owner station searches backward for the highest addressed demanding station and passes the token to that station and wherein that station in turn has a demand window and if it perceives multiple demanders, passes the token backward to the highest addressed demander, and wherein this process is continued until the demander having an address closest to the first station's FROM station is located, which demander then patches itself into the token list by requesting that the first station's FROM station change the address of its TO station to the present token owner station.

33. A method of communicating over a communication medium by a plurality of stations interconnected to the medium, comprising the steps of:
(1) generating a list of all stations wanting periodic access to the medium (TOKEN LIST);
(2) each station in the token list knowing from what station (its FROM station) it is to receive access transfer information to allow it to obtain access to the medium, as well as to what station (its TO station) it is to next pass access transfer information after it has received access to the medium;
(3) each station in the list listening to the medium to ascertain when its FROM station has access to the medium so that when this condition occurs and if it (the station to next receive access) determines that its FROM station does not transmit on the medium within a predetermined length of time, initiating and obtaining its own access to the medium.

34. A method as defined in claim 33 wherein each station in the list after having access to the medium in turn passing access information to its TO station and if the TO station does not appropriately respond to the transfer of access transfer information, the station which sent the access transfer information determining the TO station's TO station so as to pass access transfer information to the TO station's TO station.

35. A method as defined in claim 34 wherein each station which has access to the medium, if such station determines that its TO station is not appropriately responding to the transfer of access information, in addition to passing access transfer information to its TO station's TO station further patches out its original TO station from the TOKEN LIST.

36. A method as defined in claim 35 wherein the station which determines that its FROM station is not operating properly determines its new FROM station when this new FROM station patches out its previous TO station by determining its TO station's TO station.

37. An access method for passing access to a communication medium by a plurality of addressable stations that interface with the medium, comprising the steps of:
(1) each station if it is active, entering a BUS IS DEAD state upon not seeing intelligible information on the medium for a predetermined length of time;
(2) each station which has entered the BUS IS DEAD state waiting an amount of time proportional to its address, with the first station to have its time period expire (BUS REBUILD TIMEOUT event 68) entering a PASSING INITIALIZATION TOKEN (search) state for determining the next station to enter this search state and if such a station is found, for itself to enter the token list (IN LIST state) as the first station in the list;
(3) each station that enters the PASSING INITIALIZATION TOKEN state in turn entering the token list after determining the next station to enter the PASSING INITIALIZATION TOKEN state; and
(4) continuing step 3 until the first station to enter the token list is the next station that would enter the PASSING INITIALIZATION TOKEN state, at which time the initial token list is completed; whereby an initialization of stations to have periodic access to the medium is obtained upon initial start up or whenever intelligible information is not seen on the medium by a station for a predetermined length of time.

38. An access method as defined in claim 37 wherein each station when in the PASSING INITIALIZATION TOKEN state, if unsuccessful in its search for the next station to receive the initialization token, enters on ONLY ONE state where it remains until message activity is seen on the medium or the station receives the initialization token.

39. An access method as defined in claim 38 wherein each station when in the ONLY ONE state, periodically passes the token to itself so as to inform all other stations interfaced with the medium that it is active on the medium and further wherein this time period is substantially greater than the time out period for entering the BUS IS DEAD state so that a station in the ONLY ONE state does not burden the medium with token passes to itself in the event that the station in the ONLY ONE state is truly faulty.

40. An access method as defined in claim 37 wherein the first station to enter the search state sets a search stop bit which is the means by which step 4 is ended with completion of the initial token list.

41. An access method for transferring access to a communication medium by a plurality of station interfaced to the medium wherein no single station failure can incapacitate or cause the reinitialization of the remaining stations, comprising steps of:
(1) generating a list of all stations which have periodic access to the medium (TOKEN LIST);
(2) each station in the token list knowing from which station (its "FROM" station) it is to receive its token as well as to which station (its "TO" station) it is to pass the token after it has received the token;
(3) each station in the token list, when it has the token, being able to use and command use of the medium by respectively generating non-access messages or commanding other stations to generate non-access messages to the exclusion of all other stations for a maximum non-access message predetermined length of time after receipt of the token;
(4) each station having the token in turn initiating the passing of the token to its TO station within the non-access message predetermined length of time;
(5) each station in the token list listening to the medium to determine when its FROM station has been passed the token, and when the token has been passed to its FROM station, that observing station waiting a first predetermined length of time to determine if its FROM station has generated any type of message on the medium and if no message is perceived by the observing station, the observing station takes the token from its FROM station;
(6) each station (the observing station) which passes the token to its TO station listening to the medium to determine if its TO station has generated any type of message on the medium within a second predetermined length of time different from the first predetermined length of time, and if no message is perceived by the observing station from its TO station, the observing station generates a broadcast message on to the medium requesting identification of its TO station's TO station, and upon ascertaining its TO station's TO station sending the token to its TO station's TO station;
whereby each station in the token list by knowing from which station it has received the token and to which station it is to pass the token eliminates the need for reinitializing the token list upon the perceived malfunctioning of any station in the token list.

42. An access method as defined in claim 41 wherein any station which is perceived as not properly using the token or failing to accept the token is patched out of the token list by the remaining stations in the token list.

43. An access method as defined in claim 42, wherein each station when it receives the token and before initiation of non-access messages, listens to the medium during a predetermined demand window time period so that any station between the present token owning station and the station which sent the token to the token owning station (the FROM station) may demand the token (demanding station) from the present token owning station and further wherein the demander station is patched into the token list.

44. An access method as defined in claim 43 wherein if two or more stations demand access to the medium during the same demand window, the present token owning station searches backward for the demanding station closest to itself and passes the token to that station and wherein that station in turn presents a demand window before it initiates non-access messages so that it can accept demanders between itself and the previous FROM station.

45. An access method as defined in claim 44 wherein each station in the token list if it does not hear at least one message on the medium within a third predetermined length of time, enters a state (BUS IS DEAD) from which regeneration of a token list can be obtained.

46. An access method as defined in claim 45 further wherein each station which enters the BUS IS DEAD state waits an amount of time proportional to a unique characteristic of the station, which for the first station to time out, enters a search state for determining the next station to enter the search state and if such a station is found, for itself to enter the token list as the first station in that list; and further wherein each station which enters the search state in turn enters the token list upon determining the next station to enter the search state, and continuing the search until the first station to enter the token list is the next station that would enter the search state; at which time the token list is completed.

47. An access method as defined in claim 46 wherein each station has a unique address and wherein the unique characteristic for determining the first station to enter the search state is the address of the station.

48. An access method as defined in claim 40 wherein each station in the token list if it does not hear messages on the medium within a third predetermined length of time, enters a state (BUS IS DEAD) from which regeneration of a token list can be obtained.

49. An access method as defined in claim 48 further wherein each station which enters the BUS IS DEAD state waits an amount of time proportional to a unique characteristic of the station, which for the first station to time out, enters a search state for determining the next station to enter the search state and if such a station is found, for itself to enter the token list as the first station in that list; and further wherein each station which enters the search state in turn enters the token list upon determining the next station to enter the search state, and continuing the search until the first station to enter the token list is the next station that would enter the search state; at which time the token list is completed.

50. An access method as defined in claim 49 wherein each station has a unique address and wherein the unique characteristic for determining the first station to enter the search state is the address of the station.

51. A masterless communication system of the type comprising three or more stations connected to a medium, wherein each station that is able to control the transmission of information on the medium comprises:
(A) means for initiating the generation of a list of all stations wanting periodic access to the medium (token list);
(B) means for sending access type messages for receiving and transferring access to the medium between itself and other stations connected to the medium and non-access type messages for transferring all other types of information to stations connected to the medium;
(C) means for knowing from which station (its "FROM" station) it is to receive access transfer enable information and access control information (token) to allow it to obtain access to the medium, as well as to which station (its "TO" station) it is to next pass access transfer enable information and access control information after it has received access to the medium;
(D) means for generating a first timeout, said means enabled after the station has received access to the medium,
(E) means for initiating the transmission of non-access messages on the medium or passing access transfer enable information to its TO station before said first timeout;
(F) means for generating a maximum non-access message timeout, said means enabled after the station has received access to the medium;
(G) means for passing access transfer enable information to its TO station within said maximum non-access message timeout;
(H) means for generating a second timeout, said means enabled whenever a station passes access transfer enable information to its TO station;
(I) means for acknowledging receipt of the access transfer enable information by the station receiving same to the station from which it was received, said acknowledgement generated within said second predetermined length of time;
(J) means for listening to the medium ascertain if its TO station has sent acknowledge receipt information of the access transfer enable information within the second predetermined length of time;
(K) means for sending access control information to its TO station if acknowledge receipt information has been received within said second timeout;
(L) means for resending up to N number of times (where N is an integer equal to or greater than 0) access transfer enable information to its TO station if the station passing access transfer enable information does not receive from its TO station such acknowledge receipt information within the second timeout;
(M) means for sending a broadcast message to all stations interconnected to the medium requesting identification of the station which is the present station's TO station's TO station if the station passing access transfer enable information has not received acknowledge receipt information from its TO station after resending access transfer enable information N times; and (N) means, responsive to ascertainment of its TO station's TO station for sending access transfer enable information to that new TO station.

52. A masterless communication system as defined in claim 51 wherein each station that is able to control the transmission of information on the medium further comprises means for patching out a station from the token list which does not acknowledge receipt of access transfer enable information.

53. A masterless communication system as defined in claim 52 wherein each station in the token list has means for listening to the medium to ascertain when its FROM station has access to the medium so that when this condition occurs and if it determines that its FROM station does not transmit on the medium within the first predetermined length of time, initiating and obtaining its own access to the medium and patching out its FROM station from the token list.

54. A masterless communication system as defined in claim 51 wherein each station in the token list has means for listening to the medium to ascertain when its PROM station has access to the medium so that when this condition occurs and if it determines that its FROM station does not transmit on the medium within the first predetermined length of time, initiating and obtaining its own access to the medium.

55. A masterless communication system as defined in claim 54, wherein each station in the list further comprises means for ascertaining the number of times that it has passed the token to its TO station in an error-free manner and if the number of such passes exceeds a predetermined number, eliminating the token enable information and token acknowledge information for the transfer of the token for that station and only transferring the token to its TO station.

56. A masterless communication system as defined in claim 51, wherein the station that passes the token has means for listening to the medium to ascertain if its TO station is transmitting on the medium within a third predetermined length of time, and if its TO station is not so using the medium as perceived by the station that passed the token, then that station further having means for reattempting M number of times (where M is an integer equal to or greater than 0) to pass access transfer enable information to its TO station; and further wherein if the TO station does not acknowledge receipt of this access transfer enable information within the second predetermined length of time or does not transmit on the medium within the third predetermined length of time, having means for sending a broadcast message to all stations asking for identification of the station which is the present station's TO station's TO station and upon ascertaining its TO station's TO station, passing access transfer enable information and access control information to that station by the means set forth in elements G through I of claim 55.

57. A masterless communication system as defined in claim 56 wherein each station in the token list further comprises means for patching out a station from the token list which has been skipped over by its FROM station.

58. A masterless communication system as defined in claim 50 wherein the means for generating a list of stations wanting periodic access to the medium comprises the following submeans:
(a) submeans for entering a state (BUS IS DEAD) for initial generation of the token list whenever a token list does not exist upon power up;
(b) each station which has entered the BUS IS DEAD state having means for waiting an amount of time proportional to a unique characteristic of the station (BUS REBUILD TIMEOUT 68), which, for the first station to so timeout, has means for entering a search state (PASSING INITIALIZATION TOKEN state) for determining the next station to enter the search state and if such a station is found, for itself to enter the token list state (IN LIST state) as the first station in that list;
(c) each station that enters the PASSING INITIALIZATION TOKEN state having means for in turn entering the token list after determining the next station to enter the PASSING INITIALIZATION TOKEN state; and
(d) continuing the function recited by the submeans in element c until the next station that enters the PASSING INITIALIZATION TOKEN state is the first station that entered the token list, at which time the initial token list is completed.

59. A masterless communication system as defined in claim 58 wherein each station has a search stop bit and further wherein the first station to enter the search state has means for setting this bit, and further wherein each station has means for sensing the state of said bit in the station that it determines is to next enter the search state so as to end the initial token list upon perception of a set search stop bit in said next station.

60. A masterless communication system as defined in claim 59 wherein each station has an address and wherein the unique characteristic of each station for determining its bus rebuild timeout period is the address of the station.

61. A masterless communication system as defined in claim 60 wherein
(a) each station on the medium which is active has means for entering a BUS IS DEAD state upon not seeing intelligible information on the medium for a fourth predetermined length of time; each station which enters the BUS IS DEAD state having means for waiting an amount of time proportional to its address, with the first station to have its time period expire (BUS REBUILD TIMEOUT event 68) having means for entering the PASSING INITIALIZATION TOKEN state for determining the next station to enter this state and if such a station is found, for itself to enter a token list (IN LIST state) as the first station in the list;
(b) each station that enters the (PASSING INITIALIZATION TOKEN state) having means for in turn entering the token list after determining the next station to enter the PASSING INITIALIZATION TOKEN state; and
(c) continuing the function recited by the submeans in element b until the first station to enter the token list is the next station that would enter the PASSING INITIALIZATION TOKEN state, at which time a token list is completed.

62. A masterless communication system as defined in claim 61, further wherein some of the stations that connect to the medium cannot control the transmission of information on the medium and wherein all communications by these stations are in response to messages received from stations which have access to the medium.

63. A masterless communication system as defined in claim 62 wherein each station in the PASSING INITIALIZATION TOKEN state, if unsuccessful in its search for the next station to receive the initialization token, has means for entering an ONLY ONE state where it remains until any type message activity is seen on the medium or the station receives the initialization token.

64. A masterless communication system as defined in claim 63 further wherein a station in the ONLY ONE state if it receives an initialization token from another station which is conducting an initialization search, has means for becoming the station which continues the initialization search and thus is no longer in the ONLY ONE state.

65. A masterless communication system as defined in claim 64 wherein a station in the ONLY ONE state has means for entering an OUT OF LIST state if it receives a message from the medium.

66. A masterless communication system as defined in claim 65 wherein a station in the ONLY ONE state has means for entering an OUT OF LIST state if it receives a message from the medium.

67. A masterless communication system as defined in claim 51 wherein the TO station after receipt of access control information has means for providing a demand window for a fifth predetermined length of time so as to allow stations (demanders) having address between the present token owner's address and its FROM station's address to request entry into the token list, and if such a request is received during the demand window time period, having means for passing the token to the demanding station.

68. A masterless communication system as defined in claim 67, wherein the station which demands access to the medium has means for informing the FROM station of the station that passed the token, to change the address of its TO station with its (the demander's) address; whereby the demanding station is patched into the token list and need not demand the token any longer.

69. A masterless communication system as defined in claim 68 wherein the station which demands the token, upon receipt of the token, has means for initiating a demand window whereby any station having an address between the previous FROM station and the present demand station can demand access to the medium, and if such a demand station is perceived, the station is patched into the token list.

70. A masterless communication system as defined in claim 69 wherein each station has an address and if two or more stations demand access to the medium during the same demand window, the present token owner station has means for searching backward for the highest addressed demanding station and passes the token to that station and wherein that station in turn has means for generating a demand window which, if it perceives multiple demanders, passes the token backward to the highest addressed demander, and wherein this backward passing of the token is continued until the lowest addressed demander is located, which demander has means for patching itself into the token list by requesting that the first station's FROM station change the address of its TO station to the present token owner station.

71. A masterless communication system as defined in claim 51 wherein each station in the token list if it does not perceive either passing of the token from one station to another or non-access messages on the medium within a sixth predetermined length of time, has means for entering the BUS IS DEAD state.

72. A masterless communication system as defined in claim 51 wherein the means for ascertaining a station's TO station's TO station encompasses the TO station's TO station having means for listening to the medium for a message that identifies its FROM station as another station's TO station which is not operating properly and for which the identity of its TO station is required, and wherein the TO station's TO station in response has means for sending a message to its FROM station's FROM station to identify itself as the TO station's TO station.

73. A masterless communication system as defined in claim 72 wherein the station seeking its TO station's TO station has means for sending a broadcast message containing a WHO'S NEXT command and wherein the TO station's TO station upon receiving such a WHO'S NEXT command, has means for sending an I'M NEXT command to its FROM station's FROM station so as to identify itself to that station.

74. An access machine for initializing a first group of stations (token list) forming a perfect intersection or a subset of a second group of stations interfaced with a communication medium, the first group of stations to share periodic access to the communication medium, comprising:
(A) each station having means for powering up and for entering a state (NEW ONE) which upon expiration of a timeout (NEW ONE TIMEOUT 66) causes entering of another state (BUS IS DEAD) for initial generation of a list (token list) of all stations which want to have periodic access to the medium (token ownership);
(B) each station which has entered the BUS IS DEAD state having means for waiting an amount of time proportional to a unique characteristic of the station (BUS REBUILD TIMEOUT 68), which, for the first station to timeout, enters a search state (PASSING INITIALIZATION TOKEN) for determining the next station to enter the search state, and if such a station is found, for itself to enter the token list state (IN LIST) as the first station; and
(C) each station that enters the PASSING INITIALIZATION TOKEN state in turn having means for entering the token list after determining the next station to enter the PASSING INITIALIZATION TOKEN state unless the next station to enter the PASSING INITIALIZATION state is the first station to enter that state, at which point the initial token list is completed;
whereby an initialization of stations to have periodic access to the medium is obtained.

75. An access machine as defined in claim 74 wherein each station to enter the token list has means for knowing the station (FROM station) from which it is to receive the token as well as to which station (TO station) it is to pass the token.

76. An access machine as defined in claim 75 wherein each station has an address and wherein the unique characteristic of each station for determining its bus rebuild timeout period is the address of the station.

77. An access machine for allowing one of a plurality of stations interfaced to a communication medium to be able to control the transmission of information on the medium, comprising:
(A) means for generating a list of all stations wanting periodic access to the medium (TOKEN LIST);

(B) each station in the token list having means for knowing from what station (its FROM station) it is to receive access transfer information to allow it to obtain access to the medium, as well as to what station (its TO station) it is to next pass access transfer information after it has received access to the medium; and (C) each station in the list having means for listening to the medium to ascertain when its FROM station has access to the medium so that when this condition occurs and if it (the station to next receive access) determines that its FROM station does not transmit on the medium within a predetermined length of time, further having means for initiating the obtaining its own access to the medium.

78. An access machine as defined in claim 77 wherein each station in the list after having access to the medium in turn having means for passing access information to its TO station, and further wherein each station has means for responding to the receipt of access transfer information, so that if the TO station does not appropriately respond to the transfer of access transfer information, the station which sent the access transfer information has means for determining the TO station's TO station and for passing access transfer information to the TO station's TO station.

79. An access machine as defined in claim 78 wherein each station which has access to the medium further has means for patching out its original TO station from the TOKEN LIST if that station is perceived as not appropriately responding to the transfer of access information.

80. An access machine as defined in claim 79 wherein the station which determines that its FROM station is not operating properly has means for determining its new FROM station when this new FROM station patches out its TO station by determining its TO station's TO station.

* * * * *

UNITED STATES PATENT AND TRADEMARK OFFICE
CERTIFICATE OF CORRECTION

PATENT NO. : 4,491,946
DATED : January 1, 1985
INVENTOR(S) : J. Michael Kryskow, Jr., et al It is certified that error appears in the above-identified patent and that said Letters Patent are hereby corrected as shown below:

Column 32, line 12 - delete the word "informationm" and substitute therefor -- information --.

Column 33, line 2 - delete the numeral "5" and substitute therefor -- 1 --.

Column 34, line 52 - delete the word "it" and substitute therefor -- if --.

Column 41, line 21 - delete the word "PROM" and substitute therefor -- FROM --.

Column 45, line 15 - delete the phrase "the obtaining" and substitute therefor -- and obtaining --.

Signed and Sealed this

Twelfth Day of November 1985

[SEAL]

Attest:

Attesting Officer

DONALD J. QUIGG

Commissioner of Patents and Trademarks